US006301316B1

United States Patent
Uchida et al.

(10) Patent No.: US 6,301,316 B1
(45) Date of Patent: Oct. 9, 2001

(54) FREQUENCY SHARING MOBILE COMMUNICATION SYSTEM EQUIPPED WITH DIVERSITY RECEIVER INCORPORATED WITH SHARED WAVE CANCELLER

(75) Inventors: Yoshinori Uchida; Shinji Matsumoto, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/091,732
(22) PCT Filed: Mar. 31, 1997
(86) PCT No.: PCT/JP97/01113
  § 371 Date: Jun. 24, 1998
  § 102(e) Date: Jun. 24, 1998
(87) PCT Pub. No.: WO98/44656
  PCT Pub. Date: Oct. 8, 1998
(51) Int. Cl.[7] .................................................. H04B 7/10
(52) U.S. Cl. .................................... 375/347; 375/343
(58) Field of Search .................... 370/328, 329, 370/342, 344, 337, 335, 336, 345; 375/343, 347

(56) References Cited

U.S. PATENT DOCUMENTS

| 5,363,403 | 11/1994 | Schilling et al. |
| 5,511,068 | 4/1996 | Sato. |
| 5,629,929 | * 5/1997 | Blanchard et al. .................. 370/201 |
| 5,805,581 | * 9/1998 | Uchida et al. ....................... 370/335 |

FOREIGN PATENT DOCUMENTS 9642146  12/1996  (WO).

* cited by examiner

Primary Examiner—Wellington Chin
Assistant Examiner—Brenda Pham
(74) Attorney, Agent, or Firm—Rothwell, Figg, Ernst & Manbeck

(57) ABSTRACT

In a mobile communication system, FDMA/TDMA signals, CDMA signals or TD-CDMA signals have a same time-slot and one signal shares a frequency in the time-slot. The system of a time-slot sharing and a frequency sharing has diversity receivers for demodulating information of desired waves based on signals in which shared waves have already been removed at receiving of desired waves when one signal is a desired wave and there are one or more shared waves.

21 Claims, 33 Drawing Sheets

FREQUENCY SHARING MOBILE COMMUNICATION SYSTEM EQUIPPED WITH DIVERSITY RECEIVER INCORPORATED WITH SHARED WAVE CANCELLER

TECHNICAL FIELD

The present invention relates to a frequency sharing mobile communication system to provide a frequency sharing having one or more diversity receivers including one or more shared wave cancellers to remove shared waves.

BACKGROUND ART

In general, a mobile communication system comprises mobile communication devices such as vehicle telephones or portable telephones (hereinafter referred to as mobile stations) and base stations for communicating the mobile stations through radio channels, for example. In this mobile communication system, radio frequency spectrums in different radio communication methods are possibly shared (hereinafter referred to as a frequency sharing) between FDMA/TDMA method (frequency division multiple access/multi-carrier time division multiple access method) and CDMA method (code division multiple access method). In the present situation, the frequency sharing between different codes in CDMA method has been widely used.

In the frequency sharing mobile communication system based on FDMA/TDMA method and CDMA method, the CDMA signal is a shared wave when a desired wave is the FDMA/TDMA signal. In this case, the CDMA signal is the target signal to be removed. In addition, the FDMA/TDMA signal is a shared wave when a desired wave is the CDMA signal. In this case, the FDMA/TDMA signal is the target signal to be removed. Furthermore, in the frequency sharing mobile communication system based on FDMA/TDMA method and TD-CDMA (time divided CDMA) method, the TD-CDMA signal is a shared wave when a desired wave is the FDMA/TDMA signal. In this case, the TD-CDMA signal is the target signal to be removed. In addition, the FDMA/TDMA signal is a shared wave when a desired wave is the TD-CDMA signal. In this case, the FDMA/TDMA signal is the target signal to be removed. Here, TD-CDMA indicates the Time-Divided CDMA or the Time-Slotted CDMA disclosed in the United State patent U.S. Pat. No. 4,799,252 invented by Eizenhoffer, and whose technique is well known in the world.

In the prior art, although the removing method for eliminating shared wave signals in receivers having no diversity function has been disclosed, there is no method for removing shared wave signals in receivers having the diversity function.

In the prior art, there is the technique disclosed in the U.S. patent number U.S. Pat. No. 5,363,403 as the method to remove the shared wave signal when one CDMA signal is a desired wave signal and other CDMA signals are shared wave signals. However, the technique of this patent disclosed no method to eliminate transmission path distortion in a plurality of transmission paths.

In addition, the technique described in the U., patent number U.S. Pat. No. 5,511,068 disclosed an adaptive filter in a time-divided CDMA signal system. However, this U.S. patent disclosed no frequency sharing of the CDMA signal and the TDMA signal in one time slot. In addition, this U.S. patent disclosed no shared wave canceller to remove shared wave signals. Furthermore, it is difficult to apply the conventional technique disclosed in this U.S. patent when a desired wave signal is a digital signal based on FDMA/TDMA method and when a shared wave signal to be removed is the TD-CDMA signal.

Furthermore, the technique described in the Japanese patent laid open publication number JP-A6/141833 disclosed the demodulator having a reverse correlation filter in which one CDMA signal in a plurality of shared CDMA signals is used as a desired wave signal and the distortion of this CDMA signal caused in a plurality of transmission paths is compensated. However, it is difficult to apply this conventional technique to the case that the desired wave signal is the FDMA/TDMA digital signal and the shared wave signal to be removed is the CDMA signal. Furthermore, it is also difficult to apply this conventional technique to the case that the shared wave signal to be removed is the FDMA/TDMA digital signal.

In addition, the Japanese patent laid open publication number JP-A6/244746 disclosed the technique that a replica of the TDMA signal having a large signal power is made and then this TDMA replica is subtracted by the received signal in order to receive the FDMA signal having a small signal power. However, this patent disclosed no technique for CDMA signal and a time shared TDMA signal. In addition to this, this conventional technique described no transmission path simulator to simulate a plurality of transmission paths when replicas are made.

Furthermore, the Japanese patent laid open publication number JP-A8/84105 disclosed the technique of different equalization method related to the frequency diversity method. However, this technique disclosed no TD-CDMA method.

Moreover, the Japanese patent laid open publication number JP-A8/65222 disclosed the technique that a distorted radio wave obtained by using an equalization coefficient used in a radio wave receiving is transmitted. In this technique, the equalization process to be performed on the transmission path is executed when a radio wave is transmitted in advance.

Furthermore, there is the problem in the conventional mobile communication system, which comprises base stations and mobile stations communicating through radio channels, that the quality of CDMA signal or FDMA/TDMA signal as a desired wave signal becomes lower by removing the CDMA signal as a shared wave or FDMA/TDMA signal as a shared wave when the frequency sharing is used between FDMA/TDMA method and CDMA method as different radio wave communication methods.

Moreover, it must be required to construct a mobile communication system having the function of a shared wave canceller for a time-slotted TD-CDMA signal. Further, in order to realize a high quality transmission, it is also required to construct a mobile communication system having a diversity function.

The present invention is made to overcome the above problems. It is an object of the present invention to provide diversity receivers and a frequency sharing mobile communication system having the diversity receivers. These diversity receivers have the diversity function that is capable of removing a CDMA signal, a TD-CDMA signal, or a FDMA/TDMA signal as a shared wave signal without removing a CDMA desired wave signal, a TD-CDMA desired wave signal, or a FDMA/TDMA desired wave signal.

DISCLOSURE OF THE INVENTION

According to the present invention as claimed in claim 1, there is provided a frequency sharing mobile communication system having a diversity receiver comprising CDMA shared wave cancellers for canceling shared waves on channels of CDMA signals that being frequency sharing with FDMA/TDMA signals on a frequency axis, and desired wave receivers for receiving the FDMA/TDMA signals or the CDMA signals. It is thereby possible to receive desired waves with high accuracy and to avoid the occurrence of a system down caused by the failure of the transmission power control of a mobile station as the most serious defect included in CDMA method. Furthermore, it is possible to use information of the removed shared waves as effective information for other purposes when the diversity receiver according to the present invention is incorporated in a base station.

According to the present invention as claimed in claim 2, there is provided a frequency sharing mobile communication system in that the CDMA canceller for cancelling the CDMA signals sharing with the FDMA/TDMA signals in frequency fields in the diversity receiver, comprises CDMA correlators whose number is equal to the number of a plurality of diversity antennas, a correlation code generator for generating CDMA correlation codes and providing them to the CDMA correlators, transmission path equalizers whose number is equal to the number of the plurality of diversity antennas, an adder for adding output signals (hereinafter, signal is frequently abbreviated) from the transmission path equalizers, a determinator for judging the output from the adder, a modulator for inputting the output from the determinator and for generating and outputting reproduced CDMA signals, transmission path simulators, whose number is equal to the number of the plurality of diversity antennas, for reproducing interferences in a plurality of transmission paths based on the output from the modulator, and a microprocessor for determining coefficients of the transmission path simulators based on equalization coefficients of the transmission path equalizers. It is thereby possible to remove the CDMA shared waves with high accuracy.

According to the present invention as claimed in claim 3, there is provided a frequency sharing mobile communication system in that the desired wave receiver is a FDMA/TDMA desired wave receiver comprising delay elements for delaying each of signals received by the plurality of diversity antennas, independently, adders, whose number is equal to the number of the plurality of diversity antennas, for removing reproduced CDMA signals, whose number is equal to the number of the plurality of diversity antennas, output from the CDMA shared wave cancellers from the output of the delay elements by subtraction, desired wave equalizers, whose number is equal to the number of the plurality of diversity antennas, for equalizing the output from the adders, a second adder for adding the outputs from the desired wave equalizers, and a desired wave demodulator for outputting a desired wave based on the output from the second adder. It is thereby possible to receive the FDMA/TDMA desired waves with high accuracy.

According to the present invention as claimed in claim 4, there is provided a frequency sharing mobile communication system in that the desired wave receiver is a CDMA desired wave receiver comprising delay elements for delaying each of signals received by the plurality of diversity antennas, independently, adders for removing reproduced CDMA signals output from the CDMA shared wave cancellers from the output of the delay elements by subtraction, CDMA desired wave correlators, whose number is equal to the number of the plurality of diversity antennas, for correlating the output from the adders, a correlation code generator for generating CDMA correlation codes and for providing them to the CDMA desired wave correlators, desired wave equalizers, whose number is equal to the number of the plurality of diversity antennas, for equalizing the output from the CDMA desired wave correlators, an adder for adding the outputs from the desired wave equalizers, and a desired wave demodulator for outputting a desired wave based on the output from the adder. It is thereby possible to receive the CDMA desired waves with high accuracy.

According to the present invention as claimed in claim 5, there is provided a frequency sharing mobile communication system comprises a plurality of the FDMA/TDMA. desired wave receivers and a plurality of CDMA shared wave cancellers. It is thereby possible to remove a plurality of the CDMA signals as shared waves simultaneously, possible to avoid the occurrence of a system down, and to receive the desired waves with high accuracy.

According to the present invention as claimed in claim 6, there is provided a frequency sharing mobile communication system comprises the CDMA desired wave receiver and a plurality of the CDMA shared wave cancellers. It is thereby possible to remove a plurality of the CDMA signals as shared waves simultaneously, possible to avoid the occurrence of a system down, and to receive the desired waves with high accuracy.

According to the present invention as claimed in claim 7, there is provided a frequency sharing mobile communication system comprising at least one base station comprising a plurality of the CDMA shared wave cancellers and a plurality of the FDMA/TDMA desired wave receivers. It is thereby possible to receive a plurality of the FDMA/TDMA desired wave signals with high accuracy, possible to avoid the occurrence of a system down, and to use the removed the plurality of CDMA shared waves for other purposes.

According to the present invention as claimed in claim 8, there is provided a frequency sharing mobile communication system comprising at least one base station comprising a plurality of the CDMA shared wave cancellers and a plurality of the CDMA desired wave receivers. It is thereby possible to receive a plurality of the CDMA desired wave signals with high accuracy, possible to avoid the occurrence of a system down of the base station, and to use the removed the plurality of CDMA shared waves for other purposes.

According to the present invention as claimed in claim 9, there is provided a frequency sharing mobile communication system in that CDMA signals share frequency fields on a frequency axis with FDMA/TDMA signals having a same time slot configuration and the TDMA signals and the CDMA signals are divided by time (hereinafter, time-divided CDMA signals are referred to as TD-CDMA signals), not in continuous time, in the same time slot, and the frequency sharing communication system has diversity receivers of diversity function, each diversity receiver comprises TD-CDMA shared wave cancellers for canceling the TD-CDMA signals that being in frequency sharing with the FDMA/TDMA signals, and desired wave receivers for receiving desired waves. It is thereby possible to receive desired waves with high accuracy and to avoid the occurrence of a system down caused by the failure of the transmission power control of a mobile station as the most serious defect included in CDMA method. Furthermore, it is possible to use information of the removed shared waves as effective information for other purposes when the diversity receiver according to the present invention is incorporated in a base station.

According to the present invention as claimed in claim 10, there is provided a frequency sharing mobile communication system in that the TD-CDMA canceller for cancelling the TD-CDMA signals sharing with the FDMA/TDMA signals in frequency fields, comprises TD-CDMA correlators whose number is equal to the number of a plurality of diversity antennas, a correlation code generator for generating TD-CDMA correlation codes and providing them to the TD-CDMA correlators, transmission path equalizers whose number is equal to the number of the plurality of diversity antennas, an adder for adding outputs from the transmission path equalizers, a determinator for judging the output from the adder, a modulator for generating and for outputting reproduced TD-CDMA signals based on the output from the determinater, transmission path simulators, whose number is equal to the number of the plurality of diversity antennas, for reproducing interferences in a plurality of transmission paths based on the output from the modulator, and a microprocessor for determining coefficients of the transmission path simulators based on equalization coefficients of the transmission path equalizers. It is thereby possible to remove the TD-CDMA shared wave signal with high accuracy.

According to the present invention as claimed in claim 11, there is provided a frequency sharing mobile communication system in that the desired wave receiver is a FDMA/TDMA desired wave receiver comprising delay elements for delaying each of signals received by the plurality of diversity antennas, independently, adders, whose number is equal to the number of the plurality of diversity antennas, for removing reproduced TD-CDMA signals output from the TD-CDMA shared wave cancellers from the output of the delay elements by subtraction, desired wave equalizers, whose number is equal to the number of the plurality of diversity antennas, for equalizing the output from the adders, a second adder for adding the outputs from the desired wave equalizers, and a desired wave demodulator for outputting a desired wave based on the output from the second adder. It is thereby possible to receive the FDMA/TDMA desired waves with high accuracy.

According to the present invention as claimed in claim 12, there is provided a frequency sharing mobile communication system in that the desired wave receiver is a TD-CDMA desired wave receiver comprising delay elements for delaying each of signals received by the plurality of diversity antennas, independently, adders for removing reproduced TD-CDMA signals output from the TD-CDMA shared wave cancellers from the output from the delay elements by subtraction, TD-CDMA desired wave correlators, whose number is equal to the number of the plurality of diversity antennas, for correlating the output from the adders, a correlation code generator for generating TD-CDMA correlation codes and for providing them to the TD-CDMA desired wave correlators, desired wave equalizers, whose number is equal to the number of the plurality of diversity antennas, for equalizing the output from the TD-CDMA desired wave correlators, an adder for adding the outputs from the desired wave equalizers, and a desired wave demodulator for outputting a predetermined desired wave based on the output from the adder. It is thereby possible to receive the TD-CDMA desired waves with high accuracy.

According to the present invention as claimed in claim 13, there is provided a frequency sharing mobile communication system in that the desired wave receiver is a CDMA desired wave receiver comprising delay elements for delaying each of signals received by the plurality of diversity antennas, independently, adders for removing reproduced TD-CDMA signals output from the TD-CDMA shared wave cancellers from the output of the delay elements by subtraction, CDMA desired wave correlators, whose number is equal to the number of the plurality of diversity antennas, for correlating the output from the adders, a correlation code generator for generating CDMA correlation codes and for providing them to the CDMA desired wave correlators, desired wave equalizers, whose number is equal to the number of the plurality of diversity antennas, for equalizing the output from the CDMA desired wave correlators, an adder for adding the outputs from the desired wave equalizers, and a desired wave demodulator for outputting a desired wave based on the output from the adder. It is thereby possible to receive the CDMA desired waves with high accuracy.

According to the present invention as claimed in claim 14, there is provided a frequency sharing mobile communication system in that the desired wave receiver is a TD-CDMA desired wave receiver comprising delay elements for delaying each of signals received by the plurality of diversity antennas, independently, adders for removing reproduced CDMA signals output from the CDMA shared wave cancellers from the output from the delay elements by subtraction in order to cancel the CDMA signals that share in the frequency field with the FDMA/TDMA signals, TD-CDMA desired wave correlators, whose number is equal to the number of the plurality of diversity antennas, for correlating the output from the adders, a correlation code generator for generating TD-CDMA correlation codes and for providing them to the TD-CDMA desired wave correlators, desired wave equalizers, whose number is equal to the number of the plurality of diversity antennas, for equalizing the output from the TD-CDMA desired wave correlators, an adder for adding the outputs from the desired wave equalizers, and a desired wave demodulator for, outputting a desired wave based on the output from the adder. It is thereby possible to receive the TD-CDMA desired waves with high accuracy.

According to the present invention as claimed in claim 15, there is provided a frequency sharing mobile communication system mobile communication system having a diversity receiver comprising FDMA/TDMA shared wave cancellers for canceling shared waves on FDMA/TDMA signal channels that being in frequency sharing with CDMA signals on a frequency axis or being in frequency sharing with the TD-CDMA signals in a same time slot, and desired wave receivers for receiving the CDMA desired wave signals or the TD-CDMA desired wave signals. It is thereby possible to receive the desired waves with high accuracy and to avoid the occurrence of a system down caused by the failure of the transmission power control of a mobile station as the most serious defect included in CDMA method. Furthermore, it is possible to use information of the removed shared waves as effective information for other purposes when the diversity receiver according to the present invention is incorporated in a base station.

According to the present invention as claimed in claim 16, there is provided a frequency sharing mobile communication system in that the FDMA/TDMA shared wave cancellers comprises transmission path equalizers whose number is equal to the number of the plurality of diversity antennas, an adder for adding outputs from the transmission path equalizers, a determinator for judging the output from the adder, a modulator for inputting the output from the determinator and for generating and for outputting reproduced FDMA/TDMA signals, transmission path simulators, whose number is equal to the number of the plurality of diversity antennas, for reproducing interferences in the transmission path equalizers based on the output from the modulator, and a microprocessor for determining coefficients of the transmission path simulators based on equalization coefficients of the transmission path equalizers. It is thereby possible to remove the FDMA/TDMA shared waves with high accuracy.

According to the present invention as claimed in claim 17, there is provided a frequency sharing mobile communication system in that the desired wave receiver is a CDMA desired wave receiver comprising delay elements, whose number is equal to the number of a plurality of diversity antennas, for delaying each of signals received by the plurality of diversity antennas, independently, adders, whose number is equal to the number of the plurality of diversity antennas, for removing reproduced FDMA/TDMA signals output from the FDMA/TDMA shared wave cancellers from the output of the delay elements by subtraction, CDMA desired wave correlators, whose number is equal to the number of the plurality of diversity antennas, for correlating the output from the adders, a correlation code generator for generating CDMA correlation codes and for providing them to the CDMA desired wave correlators, desired wave equalizers, whose number is equal to the number of the plurality of diversity antennas, for equalizing the output from the CDMA desired wave correlators, an adder for adding the outputs from the desired wave equalizers, and a desired wave demodulator for outputting a desired wave based on the output from the adder. It is thereby possible to receive the CDMA desired waves with high accuracy.

According to the present invention as claimed in claim 18, there is provided a frequency sharing mobile communication system in that the desired wave receiver is a TD-CDMA desired wave receiver comprising delay elements for delaying each of signals received by the plurality of diversity antennas, independently, adders, whose number is equal to the number of the plurality of diversity antennas,, for removing reproduced FDMA/TDMA signals output from the FDMA/TDMA shared wave cancellers from TD-CDMA signals designated by a time slot that being equal to the time slot of the shared waves output from the delay elements, TD-CDMA desired wave correlators, whose number is equal to the number of the plurality of diversity antennas, for correlating the output having no shared wave signals provided from the adders, a correlation code generator for generating TD-CDMA correlation codes and for providing them to the TD-CDMA desired wave correlators, desired wave equalizers, whose number is equal to the number of the plurality of diversity antennas, for equalizing the output from the TD-CDMA desired wave correlators, an adder for adding the outputs from the desired wave equalizers, and a desired wave demodulator for outputting a desired wave based on the output from the adder. It is thereby possible to receive the TD-CDMA desired waves with high accuracy.

According to the present invention as claimed in claim 19, there is provided a frequency sharing mobile communication system comprising a plurality of the FDMA/TDMA shared wave cancellers and a plurality of the CDMA or TD-CDMA desired wave receivers. It is therefore possible to remove a plurality of the FDMA/TDMA shared wave signals simultaneously, and possible to receive the CDMA desired waves with high accuracy.

According to the present invention as claimed in claim 20, there is provided a frequency sharing mobile communication system having at least one base station comprising a plurality of the CDMA shared wave cancellers, a plurality of the TD-CDMA shared wave cancellers, a plurality of the FDMA/TDMA shared wave cancellers, a plurality of the FDMA/TDMA desired wave receivers, a plurality of the CDMA desired wave receivers, and a plurality of the TD-CDMA desired wave receivers. It is thereby possible to receive a plurality of desired waves with high accuracy and possible to remove a plurality of shared waves simultaneously, possible to avoid the occurrence of a system down, and possible to use the a plurality of shared waves which have been removed for other purposes.

BEST MODE FOR EMBODYING THE INVENTION

For a more detailed description of the present invention, a description will now be given of the best mode for practicing the present invention with reference to the accompanying drawings.

Embodiment 1

Figure 1:
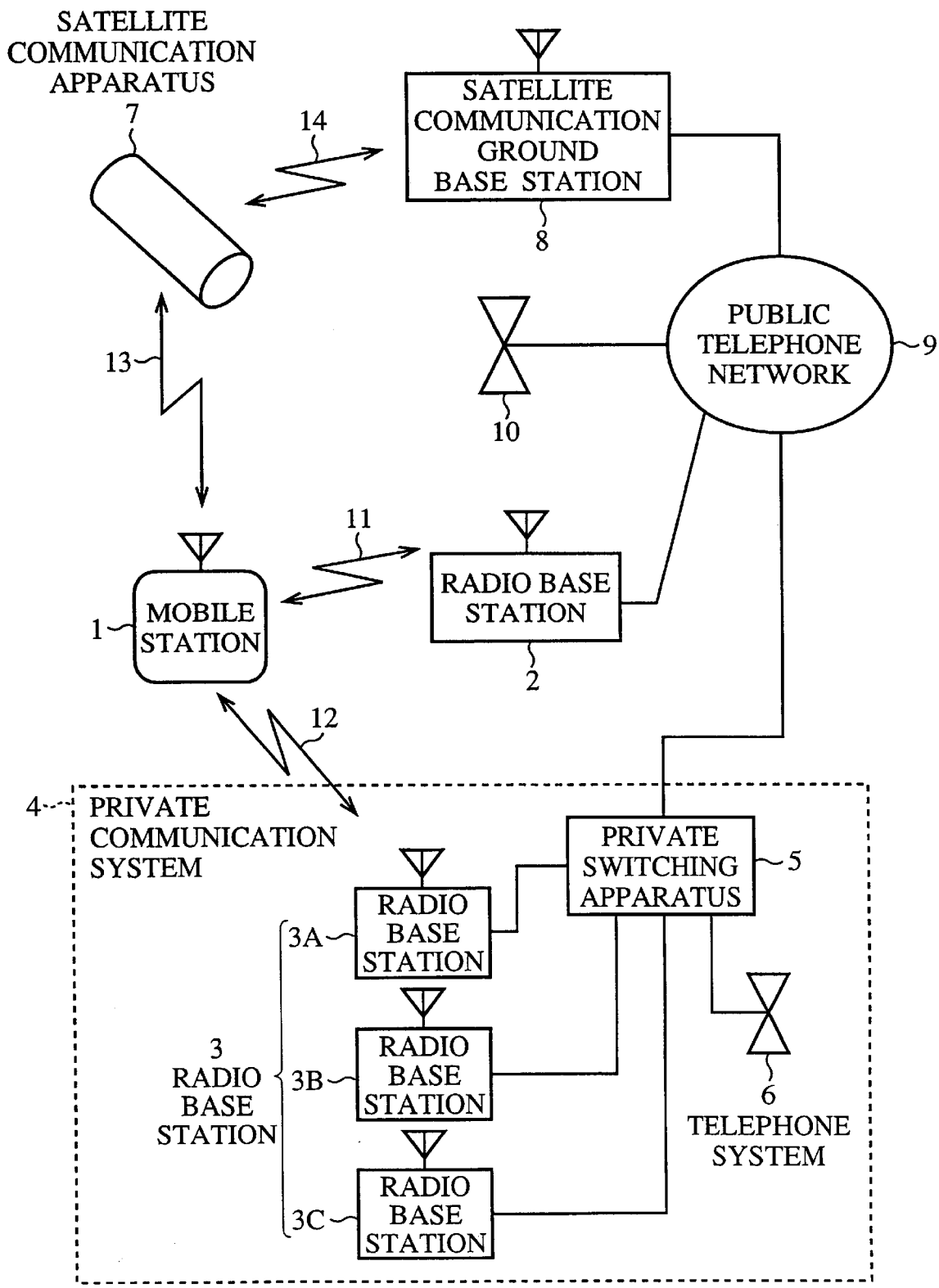
FIG. 1 is a diagram showing the entire configuration of a mobile communication system to which diversity receivers and frequency sharing mobile communication system having shared wave removing devices according to the present invention are applied.

FIG. 1 is a diagram showing the entire configuration of a mobile communication system to which diversity receivers and frequency sharing mobile communication system having shared wave removing devices according to the present invention are applied. In the diagram, 1 designates a mobile station such as mobile vehicle communication devices or mobile portable telephones, 2 denote s a radio base station to communicate the mobile station s through radio channels 11. 2 including 3A to 3C designates radio base station, connected to the private switching apparatus 5 in the private communication system 4 through wires, with which the mobile station 1 is communicated through radio channels 12. 6 designates telephone apparatus connected to the private switching device 5. 7 designates a satellite communication apparatus that is connected to the mobile station 1 by using a radio channel 13 and also connected to a satellite communication ground base stations 8 through satellite channels 14. 9 indicates a public switched telephone network (PSTN) connected to the private switching apparatus 5 and the satellite communication ground base station 8. The PSTN is also connected to a wire telephone 10. 11 indicates a radio channel through which the mobile station 1 and the radio base station 2 are connected. 12 designates a radio channel through which the mobile station 1 and the radio base station 3 in the private communication system 4 are connected. 13 denotes a radio channel through which the mobile station 1 and the satellite communication apparatus 7 are connected. 14 designates a satellite channel through which the satellite communication apparatus 7 and the satellite communication ground base station 8 are connected. The signal communications among the mobile station 1, the radio base stations 2 and 3, and satellite communication apparatus 7 are processed by using a modulation method based on the digital modulation methods (such as FSK, PBSk, QPSK, Pai/4-QDPSK, QAMSK, QGMSK, and the like), and the radio communications among them are performed based on frequency division multiple access (FDMA) method, multi-carrier time-division multiple access (Multi-carrier TDMA) method, code division multiple access (CDMA) method, or FDMA method, TDMA/FDD (Frequency duplex) method, TDMA/FDD (Time Division Duplex) method, CDMA/TDMA/FDD method, or CDMA/TDMA/TDD method.

Figure 2:
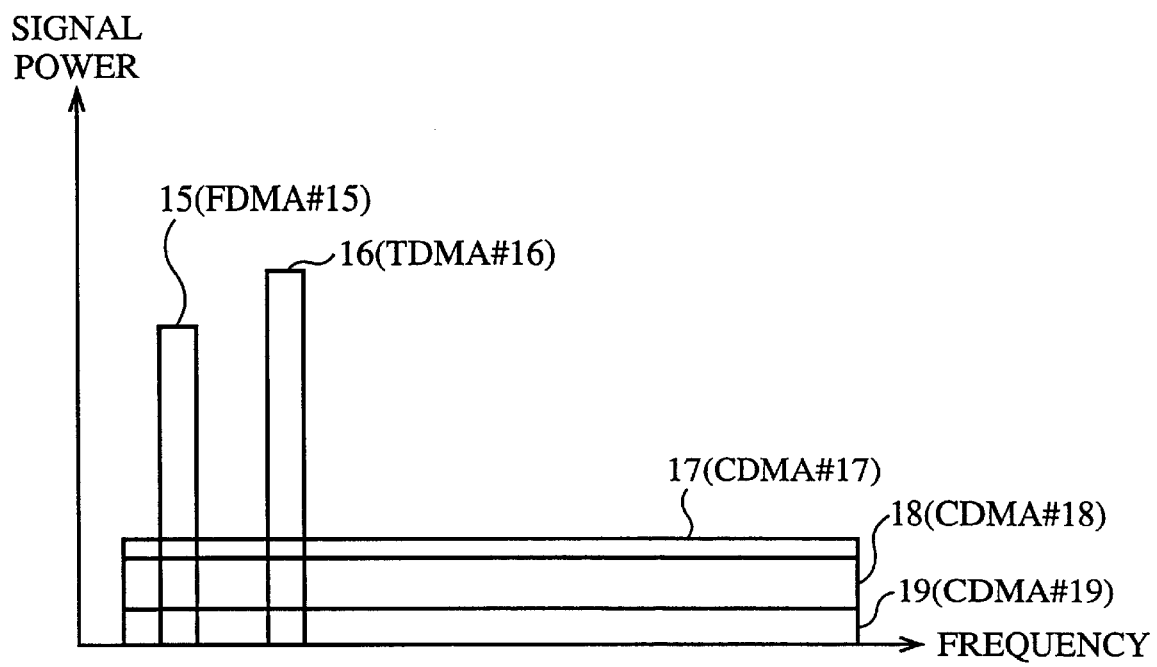
FIG. 2 is an explanatory diagram showing frequency spectrums of frequency shared radio waves.

FIG. 2 is an explanatory diagram showing frequency spectrums of frequency shared radio waves based on each communication method described above. In this case, the FDMA signal 15 and the TDMA signal 16 are shared with the CDMA signals 17, 18 and 19 in a part of frequency.

Figure 3:
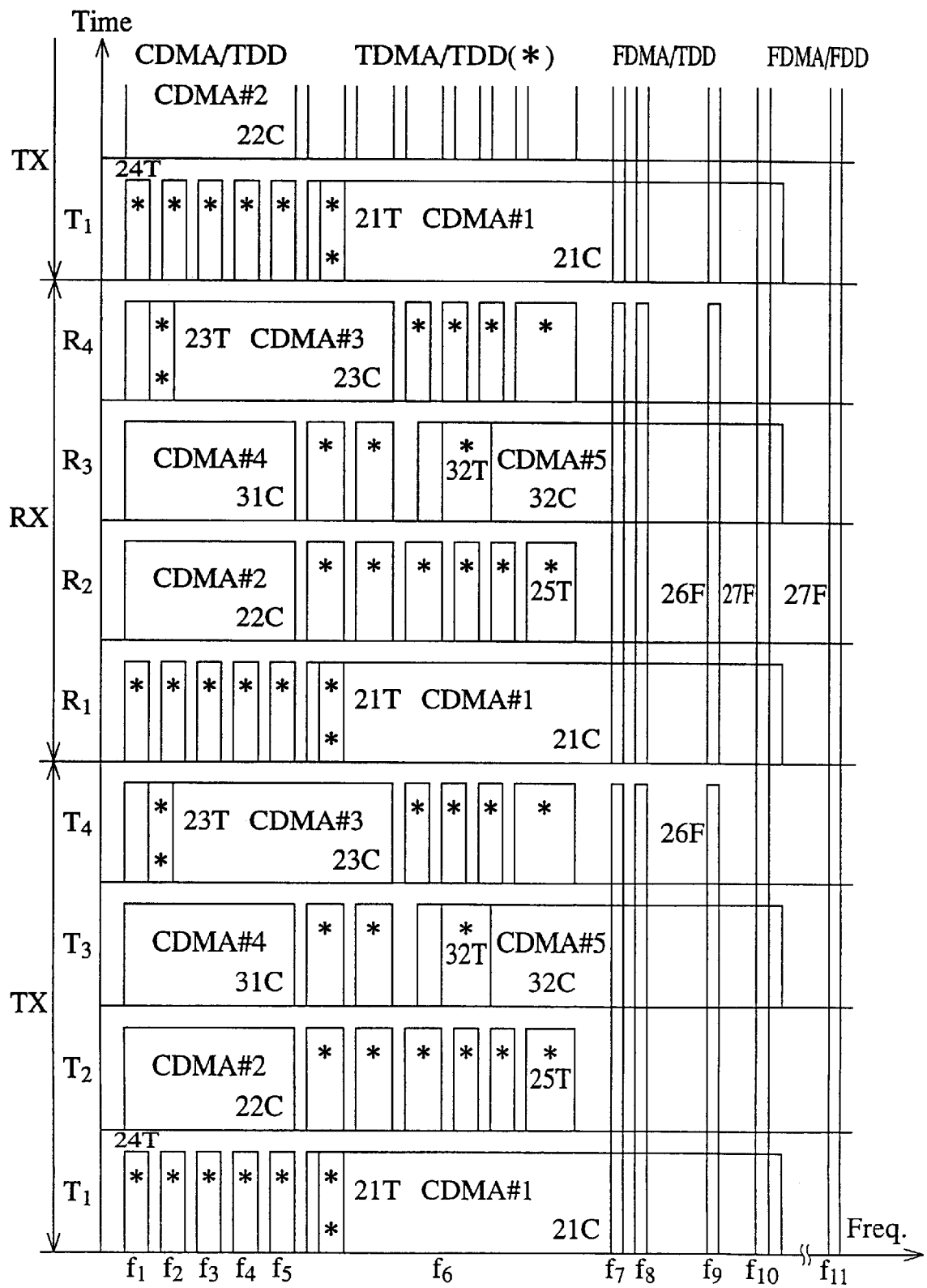
FIG. 3 is an explanatory diagram showing the relationship between frequencies and time slots in a frequency sharing mobile communication system based on FDMA/TDMA method, CDMA method, and TD-CDMA method.

FIG. 3 is an explanatory diagram showing the relationship between frequencies and time slots in a frequency sharing mobile communication system based on the FDMA/TDMA method and TD-CDMA method. As shown in FIG. 3, the TD-CDMA#1 (21) signal, one FDMA/FDD signal (27), three FDMA/TDD signals (26F, for example), one TDMA signal (21T) are sharing a partial frequency band and are sharing a time slot (T1/R1). The TDMA 23T signal, TD-CDMA#3 (23C) signal and a partial frequency are sharing a time slot. In addition, the TD-CDMA#5 (23C) signals, a FDMA/TDMA (27F) signal, three FDMA/TDD signals (26F), a TDMA signal (32T), are sharing a partial frequency band and are sharing a time slot (T3/R3). Although the explanation about CDMA method is omitted from FIG. 3 because CDMA method is an obvious one, in the following description, the explanation for CDMA method will be described. As shown in FIG. 3, it is possible to share a FDMA/TDMA signal and a TD-CDMA signal in a same frequency band in a same time slot in the diversity receiver and the frequency sharing communication system according to the present invention. When the base station 2 or 3 transmits the TD-CDMA signals to the mobile station 1, that is, because the TD-CDMA signals having adjacent time slots in time can be processed continuously by using a transmission processing function in a down-link, the transmission style becomes TDM (Time Division Multiplex). This process is same as the process of the case that a plurality of TDMA signals in adjacent time slots are transmitted from the transmission device in one of base stations to a mobile station. Hereinafter, it is not otherwise indicated that the transmission style from the base station in a down-link is TDM.

Figure 4:
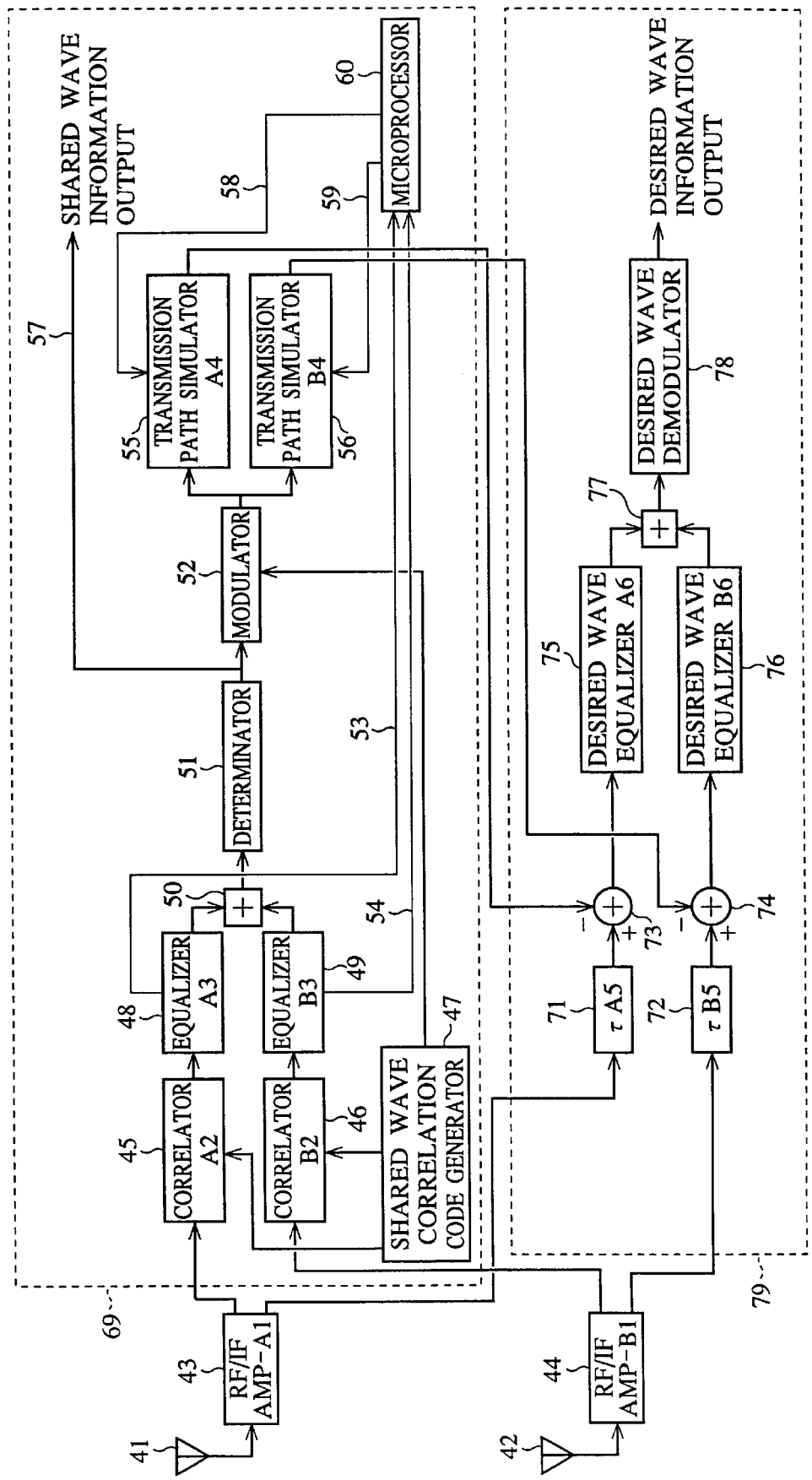
FIG. 4 is a block diagram showing a diversity receiver according to the first embodiment of the present invention.

FIG. 4 is a block diagram showing a diversity receiver according to the first embodiment of the present invention. In the diagram, 69 designates a shared wave removing apparatus for removing CDMA signals or TD-CDMA signals (hereinafter referred to as shared wave canceller), 79 denotes a desired wave receiver for selecting FDMA/TDMA signals. 41 and 42 indicate diversity antennas (hereinafter referred to as antennas), 43 and 44 designate conversion amplifiers for amplifying the radio frequency signals received by the antennas 41 and 42 by a predetermined amplification factor, for mixing them with a local oscillated signal output from a local oscillator (omitted from the diagram), and for converting them to intermediate frequency signals. Here, the intermediate frequency signals include the intermediate frequency component f0 of the shared wave CDMA or TD-CDMA signals and the intermediate frequency component f0+nfd of desired wave FDMA or TDMA signals as the desired wave signals. 45 and 46 designate CDMA or TD-CDMA orthogonal code correlators (hereinafter referred to as correlators) for inputting the intermediate frequency signal output from the conversion amplifiers 43 and 44 and for selecting a symbol rate signal component from the shared wave channel CDMA or TD-CDMA signals.

This first embodiment relates to the diversity receiver when the shared wave is the CDMA signal and the desired wave is the FDMA/TDMA signal.

A description will now be given of the operation.

Received signals that have been received by the diversity antennas 41 and 42 and then correlated by the correlators 45 and 46 are transferred to the shared wave multi-path propagation equalizers 48 and 49 (hereinafter referred to as equalizers) to remove the interferences occurred by the multi-path propagations. These signals output from the equalizers are then added by the adder 50 in order to get shared channel signals in which an interference component has been removed. The adder 50 operates based on a selection synthesis, an equal-gain synthesis, a maximum ratio synthesis, and a least-square synthesis functions. The output from the adder 50 is judged by the determinator 51, so that the shared channel information is obtained.

When the diversity receiver of the first embodiment is used as the base station receiver in the frequency sharing mobile communication system, it is possible to use the shared channel information, namely the shared wave information 57, as the information about the mobile station from which its signal is transmitted. 52 designates a shared channel digital modulator for modulating the output signal from an internal oscillator (not shown) by using the shared channel digital information output from the determinator 51 and the correlation code signal output from the CDMA or TD-CDMA orthogonal code correlator 47 for the shared CDMA or TD-CDMA signal, and for regenerating an internal shared channel modulation signal. This shared channel signal output from this modulator has no noise signal component that is included in the input signal received by the determinator 51. Accordingly, even if the addition operation (specifically speaking, this process is a subtraction process) between the received signal and the shared wave regenerated component is performed, it can be prevented to add the noise signal component. The modulated shared wave reproduced CDMA signal or the reproduced TD-CDMA signal is transferred to both of the transmission multi-path simulators (A4 and A5) 55 and 56 for simulating transmission multi-paths. The transmission multi-path simulator (A4) 55 simulates the transmission factor of the shared wave received by the antenna 41. The transmission multi-path simulator (B4) 56 simulates the transmission factor of the shared wave received by the antenna 42. The coefficients representing the characteristics of both transmission simulators 55 and 56 are generated by the inverse matrixes of the coefficients of the shared wave transmission path interference equalizers 48 and 49. This inverse matrixes are generated by the microprocessor 60.

The transmission path of the radio waves received by the antenna 41 is formed by using the coefficient of the equalizer 48 by the transmission simulator 55. The CDMA shared wave canceller 69 comprises the circuits described above and has the function as the regenerating means for regenerating the diversity received shared wave.

71 and 72 designate delay circuits for inputting the intermediate frequency signal output from each of the conversion amplifiers 43 and 44 and for delaying it by a predetermined time period. 73 and 74 denote adders for adding the reversed values of the output signals from the transmission simulators 55 and 56 and the output signals from the adders 71 and 72. These adders operate as the shared wave removing means. 75 and 76 indicate desired wave equalizers for selecting the FDMA/TDMA desired signals from the output signals, in which the shared channel signals have been removed, from the adders 73 and 74 and for amplifying the FDMA/TDMA desired signals. By the desired wave equalizers 75 and 76, the interferences of transmission paths received by the diversity antennas 41 and 42 can be removed. 77 indicates an adder that is formed based on a selection synthesis, an equal-gain synthesis, a maximum ratio synthesis, and a least-square syntheses functions. 78 designates a desired wave demodulator as a desired wave determinator for inputting the output signal from the adder 77, for judging digital information, and for outputting a desired wave information.

The desired wave receiver 79 comprising the circuits described above inputs the reproduced CDMA signal output from the shared wave canceller 69, removes the shared wave, and outputs the desired wave information.

Specifically, although the correlators 45 and 46, and the desired wave equalizers 75 and 76 include amplifiers and filters, these are omitted from the diagram. However, the amplifiers having a predetermined amplification degree and the filters used for selecting a band are incorporated in the circuits that require them. The description described above is also used for the following embodiments. In addition to this, these functions can be formed by a hardware (H/W) or a software (S/W).

The delay elements 71 and 72 delay the signals received by the antennas 41 and 42 by the time period required for processing the shared wave signals by the shared wave canceller 69 comprising the diversity shared wave regenerating function comprising the Correlators 45 and 46, the equalizers 48 and 49, the adders 50, the determinater 51, the modulator 52, and the transmission path simulators 55 and 56.

The delayed time period of the delay elements 71 and 72 is set to the time period of an integral multiple of the highest clock rate (or the number of the highest symbol clocks) of the reciprocal of an integral multiple of the highest clock rate, or of a combination of them when a plurality of symbol clock rates in the frequency sharing mobile communication system is used. Specifically, when TD-CDMA is the shared channel, it is easily performed to judge the delay time period by counting the number of symbols from the top position of the time slot. Then, the delay time period of the delay elements 71 and 72 are set by fitting the number of the symbol clocks to the processing time of the shared wave canceller, that is, by setting the number of the processing steps of the microprocessor 60. Furthermore, in this case, when the delay elements 71 and 72 are made up of memories and when the reading time period is counted by the operation processing steps, the delay time period of the shared wave canceller 69 can be fitted to the delay time period of the delay elements 71 and 72 with high accuracy.

Next, the description will now be given of the operation of the transmission path simulators 55 and 56 shown in FIG. 4.

Figure 5:
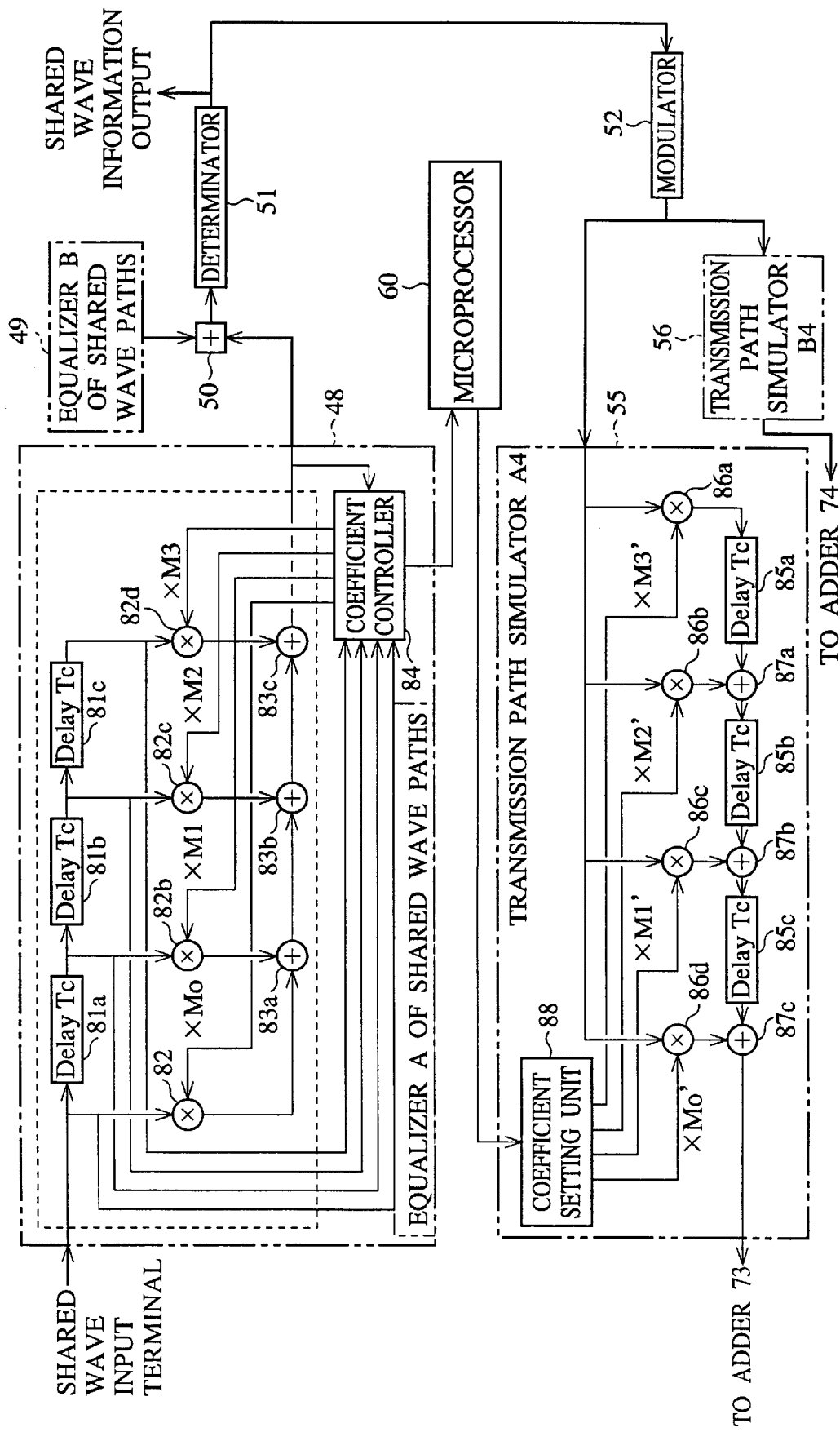
FIG. 5 is a diagram showing a configuration of an equalizer for a plurality of shared wave paths and a configuration of a transmission path simulator.

FIG. 5 is a diagram showing the configuration of the equalizers 48 and 49 for a plurality of shared wave paths and the configuration of the transmission path simulators 55 and 56.

In the equalizer 48 of the shared wave transmission paths, three delay elements 81a, 81b, and 81c delay the input signals by the unit time period Tc. The multipliers 82a, 82b, 82c, and 82d multiply the input signals inputted to the equalizers 48 and 49 of the shared wave paths and the three delay signals obtained by these equalizers by the coefficients M0, M1, M2, and M3, respectively. The operation results of the multiplies are added by the adders 83a, 83b, and 83c in order to obtain the equalized signals Coefficients by which the distortion of the transmission path can be compensated by the training sequence placed at the top position of each time slot shown in FIG. 3 are used. In the conventional techniques mentioned previously, although an example to which this type equalizer is applied for continuous CDMA signals has been disclosed, these conventional techniques disclosed no transmission path simulators 55 and 56.

The transmission path simulators 55 and 56 shown in FIG. 5 comprise three delay elements 85a, 85b, and 85c, four multipliers 86a, 86b, 86c, and 86d, three adders 87a, 87b, and 87c, and the coefficient setting unit 88.

The four multipliers 86a, 86b, 86c, and 86d input the modulated signal output from the modulator 52 and multiply it by the coefficients corresponding to each multiplier, respectively. The operation result is output to the delay elements 85a, 85b, and 85c or to the adders 87a, 87b, and 87c. The output signal from the adder 87c is the signal that is reproduced by using the transmission path delay signal for the transmission paths. When this output signal is compared with the received signal by the antennas 41 and 42, this output signal includes no interference signals other than the shared wave and includes no noises. That is, the transmission simulators 55 and 56 reproduce only the signal component having the transmission path delay distortion of the shared wave in the received signal by the antennas 41 and 42 and then output it.

As described above, according to the embodiment 1, the transmission path simulators 55 and 56 in the CDMA shared wave canceller or TD-CDMA shared wave canceller reproduce the shared wave. The reproduced shared wave gives the predetermined delay characteristic necessary to cancel-process the signals received through the diversity antennas 41 and 42, and is output to the desired wave receiver 79. Then, the signals obtained by the antennas 41 and 42 are delayed by the delay elements 71 and 72. By the adders 73 and 74, the delayed signals are added with the independently reproduced shared wave signal obtained by the transmission path simulators 55 and 56 in the shared wave canceller 69.

In a case that the diversity receiver having the shared wave canceller 69 of the CDMA signal or the TD-CDMA signal according to the embodiment 1 is incorporated in the base station 2, for example, when a failure of the transmission power control function of the mobile station 1 is happened and when an excessive signal power is transmitted from the mobile station 1, it can be avoided to happen the system down of the entire mobile communication system, because the diversity receiver of the embodiment 1 incorporated in the base station 2 is capable of removing the signal having the excessive signal power. Specifically, there is the effect that the diversity receiver gives a means possible to avoid the occurrence of the system down caused by the failure of the transmission power control of the mobile station 1 as the most serious defect included in CDMA method.

In this case, because the mobile communication system is constructed so that the transmission signal having the excessive signal power is caused only in an up-link from the mobile station 1 to the base station 2, the diversity receiver having this function is incorporated only in the base station 2. This causes to decrease the cost of equipments of the entire mobile communication system. At the same time, it can be achieved to give a means possible to avoid the system down of the mobile communication system efficiently.

In addition, as shown in FIG. 3, there is the effect to reduce the searching time to search a diffusion code in the reverse diffusion function that is the operation object of the correlator in the diversity receiver by agreeing the initial value of the diffusion code to the top position of the time slot after a CDMA signal is changed to a time slot. In general, the shared wave information is unnecessary information for mobile stations. There is a case that the shared wave information is used for other communication channels in the same system in the base station. Therefore there is a possibility that the shared wave information becomes the useful information in the base station, and it can be used as the output of the receiver incorporated in the base station.

Specifically, in the embodiment 1 and other embodiments 2 to 16 according to the present invention that will be described later, the number of the diversity antennas is two, but the present invention is not limited by this configuration. For example, the present invention can be applied to mobile communication system in which the number of the diversity antennas are three or more and it can be acceptable to use various types of shapes of the diversity antennas and it can be achieved that each of these cases has the effect that is same as the effect of the embodiment 1.

Embodiment 2

Figure 6:
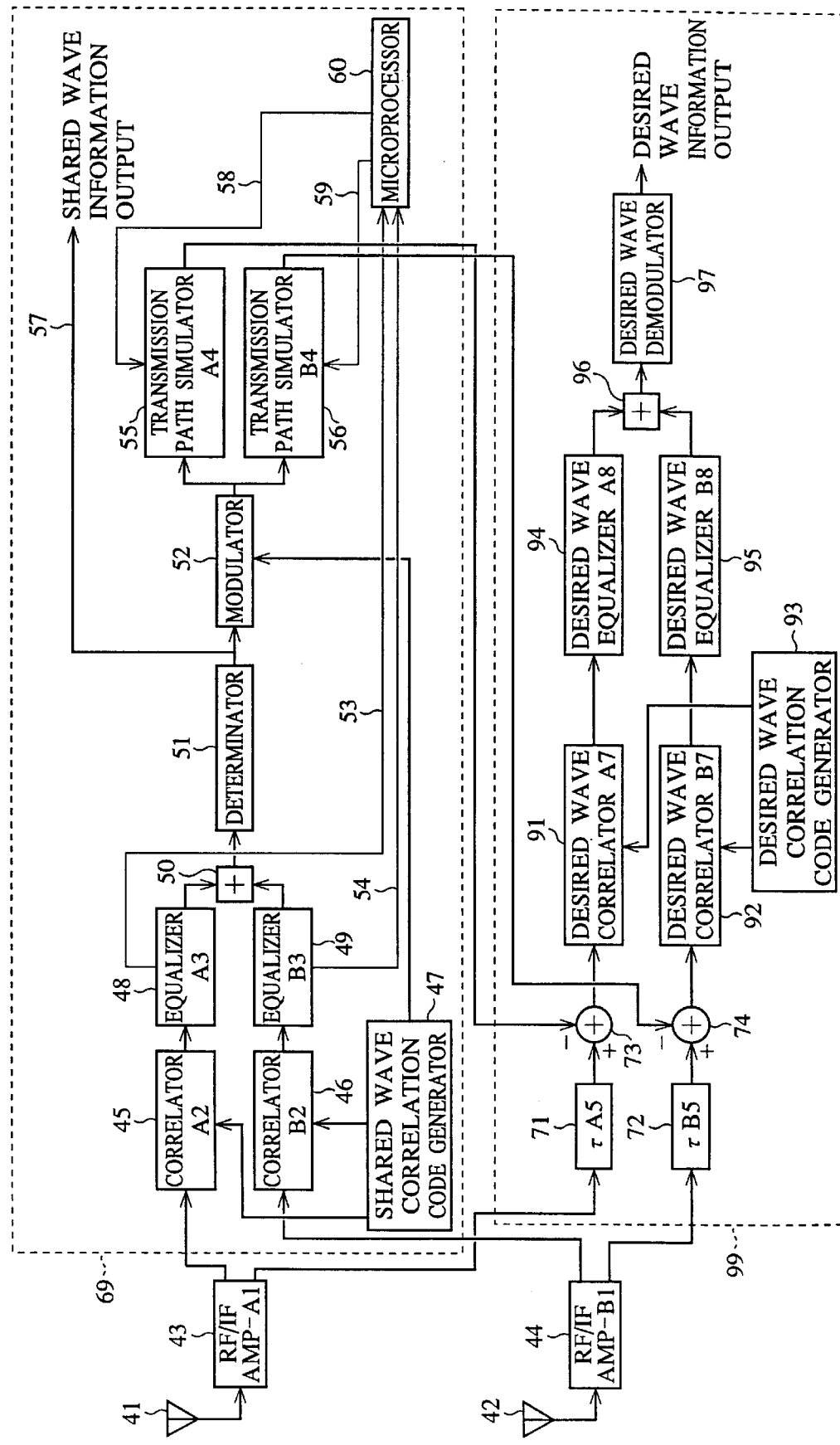
FIG. 6 is a block diagram showing a diversity receiver according to the second embodiment of the present invention.

FIG. 6 is a block diagram showing a diversity receiver according to the second embodiment of the present invention. In the diagram, 99 designates a desired wave receiver for selecting a CDMA signal or a TD-CDMA signal. The desired wave receiver 99 comprises desired wave correlators 91 and 92, a desired wave correlation code generator 93, desired wave equalizers 94 and 95, an adder 96, and a desired wave demodulator 97. Specifically, since the shared wave canceller 69 and other components when the shared wave is the CDMA signal are same as those of the first embodiment, the same reference numbers are used and the explanation for them is omitted here.

The embodiment 2 relates to the diversity receiver when the shared wave is used based on CDMA method and the desired wave is used in based on CDMA method.

A description will now be given of the operation.

The intermediate frequency signals (in this case, it is the base band signal. Specifically, because when F0=0 Hz, the intermediate frequency signal becomes the base band signal, hereinafter both are not distinguished.) output from the converters 43 and 44 are given to the shared channel correlators 45 and 46. The operation of each of the shared channel correlators 45 and 46 is same as that of the correlators used in the embodiment 1, therefore, the explanation for them is omitted here.

The intermediate frequency signals output from the converters 43 and 44 are input to the delay elements 71 and 72. Here, both signals, the signals delayed by predetermined time periods executed by the delay elements 71 and 72 and the output from the shared wave canceller 69 are added by the adders 73 and 74 per each of the diversity antennas 41 and 42.

The signals in which the shared wave has been removed are input to both of the desired wave correlator; 91 and 92. The desired wave correlators 91 and 92 output: desired wave diversity CDMA signals or the TD-CDMA signals.

These two signals output from the desired wave correlators are processed by the equalizers 94 and 95 per transmission path, respectively. The added signal by the adder 96 is output as the desired wave information by the desired wave determinator 97.

Specifically, because other components are same as those in the diversity receiver of the embodiment 1, therefore, the same reference numbers are used and the explanation for them is omitted here.

As described above, according to the embodiment 2, it is possible to provide the diversity receiver applied to the case that the shared wave is the CDMA signal or the TD-CDMA signal and the desired wave is the CDMA signal or the TD-CDMA signal. This diversity receiver is capable of receiving the desired wave correctly and it can be provided to realize a high accuracy radio communication. In addition to this feature, there is the effect that the diversity receiver has the function to avoid the occurrence of the system down caused by the failure of the transmission power control of the mobile station 1 as the most serious defect included in CDMA method.

In this case, because the mobile communication system is constructed so that the transmission signal having the excessive signal power is caused only in an up-link from the mobile station 1 to the base station 2, the diversity receiver having this function is incorporated only in the base station 2. This causes to decrease the cost of equipments of the entire mobile communication system. At the same time, it can be achieved to give a means possible to avoid the occurrence of a system down in the mobile communication system efficiently.

Embodiment 3

Figure 7:
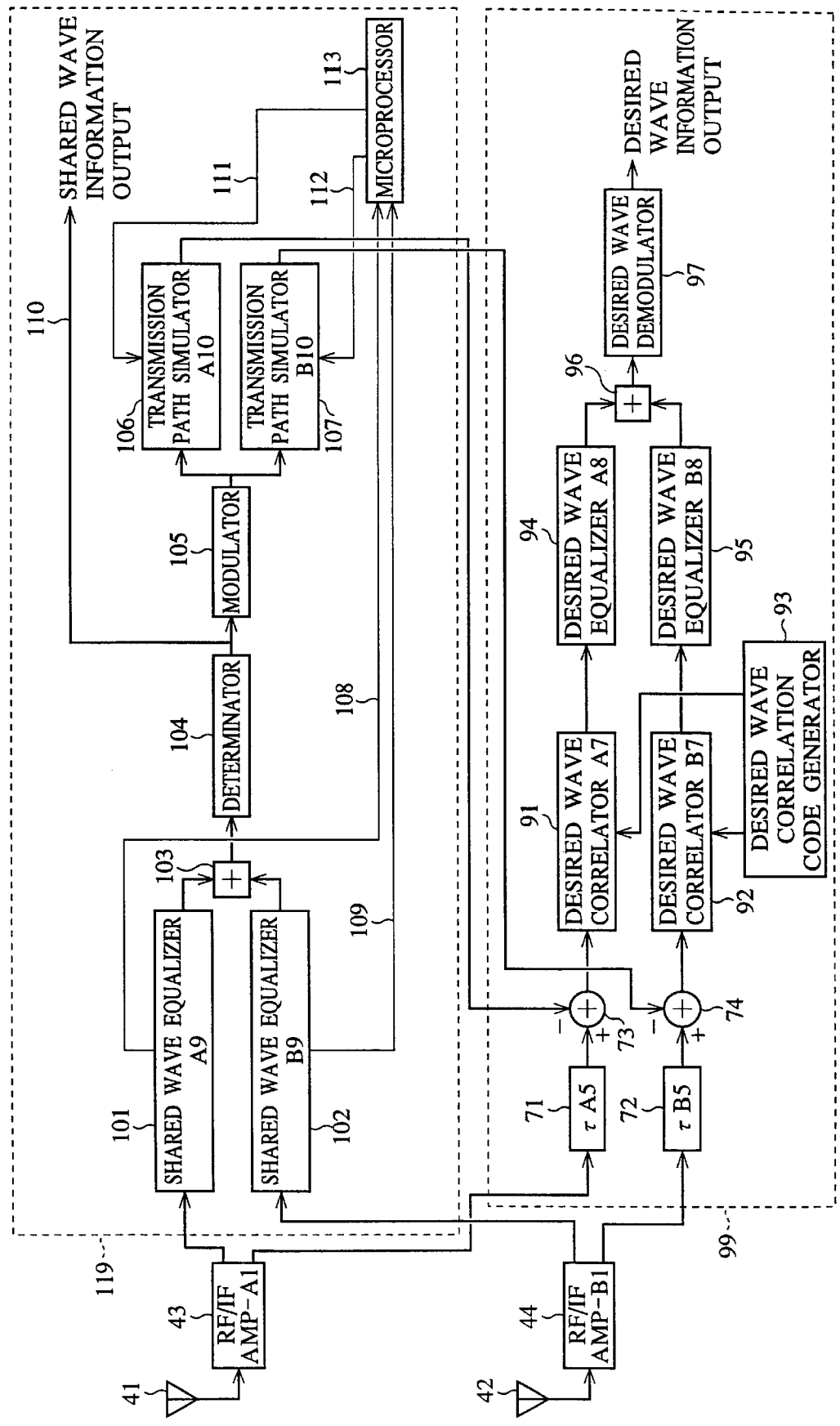
FIG. 7 is a block diagram showing a diversity receiver according to the third embodiment of the present invention

FIG. 7 is a block diagram showing a diversity receiver according to the third embodiment of the present invention. In the diagram, 119 designates a shared wave canceller for removing a FDMA/TDMA signal, 101 and 102 denote shared wave equalizers, 103 indicates an adder, 104 designates a determinator, 105 designates a modulator, 106 and 107 denote transmission simulators, and 113 indicates a microprocessor.

The diversity receiver of the embodiment 3 comprises the shared wave canceller 119 for removing the FDMA/TDMA signal and the desired wave receiver 99 for selecting the CDMA signal. The desired wave receiver 99 has the same configuration of the diversity receiver of the embodiment 2.

A description will now be given of the operation.

The signals received through the two diversity antennas 41 and 42 are input to the shared wave equalizers 101 and 102 through the converters 43 and 44 and the interference caused in each of these signal transmission paths is removed. Then, the signals are added by the adder 103. The added signal is judged by the determinator 104 to obtain the shared wave information. Because this signal is the shared wave information of the signal based on FDMA/TDMA method, it can be utilized as the communication information output signal between the base station 2 and the mobile station 1 which uses the shared wave as a communication channel.

The shared wave information is modulated by the modulator 105 and then reproduced by the transmission path simulators 106 and 107 as the signal including the communication path interference per each antenna. In this case, the coefficient of the transmission path simulator 106 is generated in the inverse matrix process using the coefficient of the equalizer 101 executed by the microprocessor 113. In addition, the coefficient of the transmission path simulator 107 is generated in the inverse matrix process using the coefficient of the equalizer 102 executed by the microprocessor 113.

The intermediate frequency signals output from the converters 43 and 44 are input to the shared wave canceller 119, as described previously, and also inputted to the delay circuits 71 and 72, simultaneously, where it is delayed by a predetermined time period.

The output signals output from the transmission path simulators 106 and 107 are inverted and then input to the adders 73 and 74 in which this inverted signal is added to the output from the desired wave delay circuits 71 and 72, respectively. In the output signal from each of the adders 73 and 74, the shared channel signal component has been removed.

Next, the output signal added by each of the adders 73 and 74 has the code correlation only of the desired wave by the CDMA signal or TD-CDMA signal desired wave code correlators 91 and 92, and then equalized by the desired wave equalizers 94 and 95, and demodulated by the desired demodulators 97. These operations are same as those of the diversity receiver as the embodiment 2, therefore the explanation for them is omitted here.

As described above, according to the embodiment 3, only the shared wave signal is transformed from the input signal including the desired wave signal which has been modulated digitally and received by the antennas 41 and 42 and interference shared wave signal that interferes with this desired wave signal. That is, the diversity receiver of the embodiment 3 transforms only the shared wave signal from the input signal and demodulates the transformed shared wave signal digitally, modulated the internal transmission wave digitally by using the shared wave information, and then inputs the obtained digital demodulated signal into the transmission path simulators 106 and 107 in order to simulate the transmission path of each of the diversity antennas, the number of them is equal to the number of the diversity antennas. Thereby, the modulated signal has the transmission path distortion. Then, the diversity reproduced shared wave signal is removed from the signals, whose number is equal to the number of the diversity antennas, that are obtained by using the diversity received signal delayed by the predetermined time period. This causes to remove jamming caused by the shared wave and it is possible to receive the desired wave signal with high quality even if the input radio wave includes the shared wave signal in addition to the desired wave signal.

Furthermore, the delay circuits to delay the input signal by a time period that is integral multiple of the symbol time of the transmission information are incorporated and the total time period of the processes in the diversity received shared wave regenerating circuit is set to integral multiple of the symbol time period, and the delayed input signal is adjusted in phase to the reproduced shared wave signal. Thereby, it can be achieved to have the effect that the shared wave signals are removed from the input signals with high accuracy.

Embodiment 4

Figure 8:
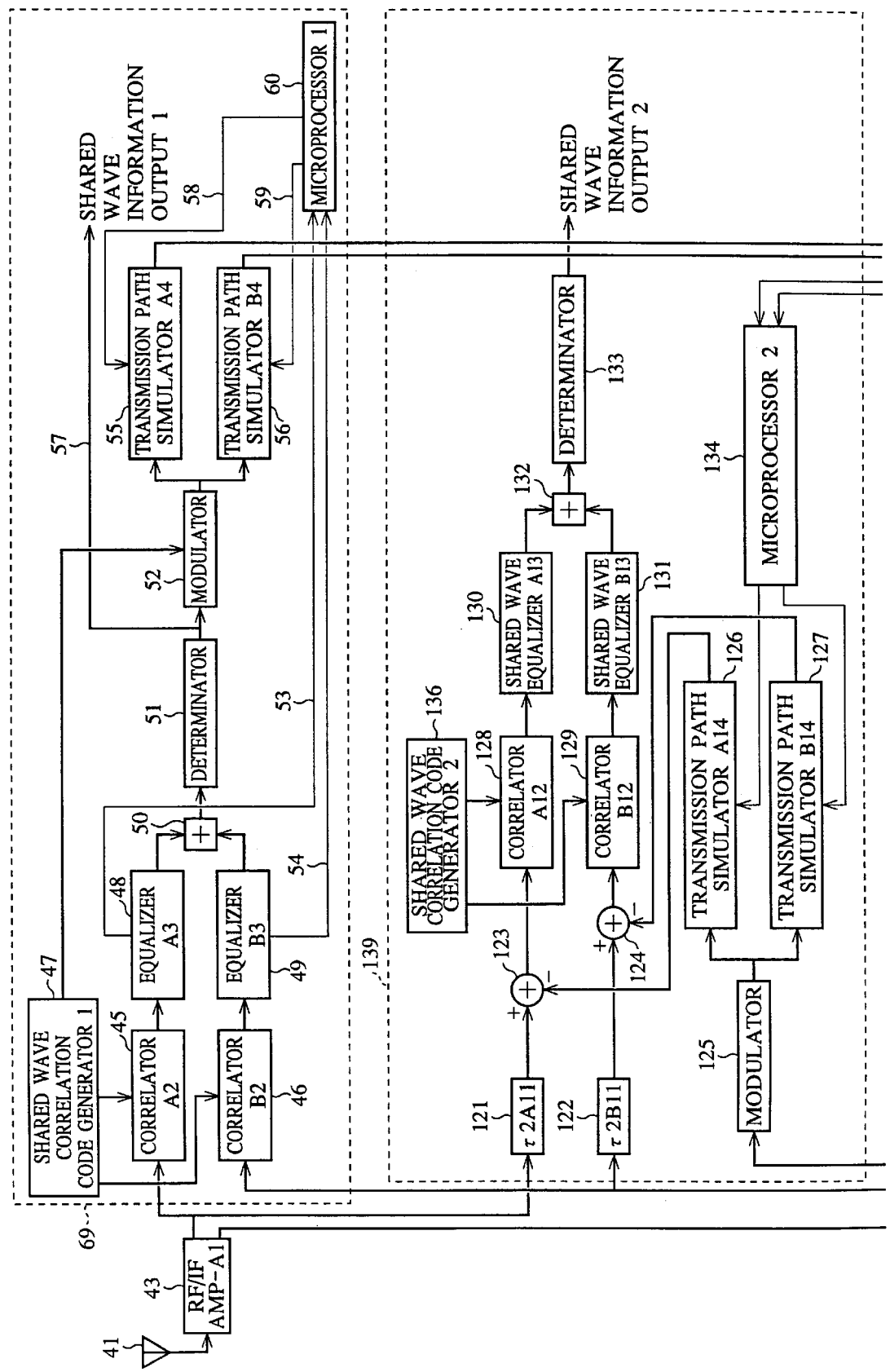
FIGS. 8 and 9 are block diagrams showing a diversity receiver according to the fourth embodiment of the present invention.
Figure 9:
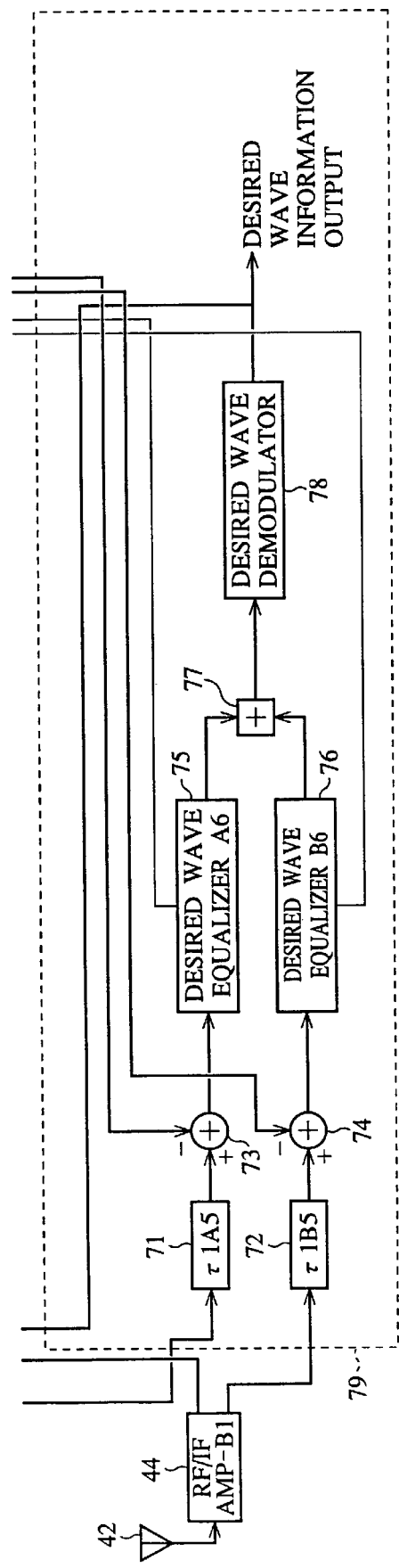

FIGS. 8 and 9 are block diagrams showing a diversity receiver according to the fourth embodiment of the present invention. In the diagrams, 69 and 79 designate the shared wave canceller and the desired wave receiver in the diversity receiver of the embodiment 1, respectively. 139 denotes a second shared wave canceller for removing the desired wave obtained by the desired wave receiver 79 from the input signal and for transforming the shared wave. Specifically, the shared wave canceller 69 for the CDMA signal and the TD-CDMA signal and the FDMA/TDMA desired wave receiver 79 are same as those of the embodiment 1. Therefore the explanation for them is omitted.

The diversity receiver of the fourth embodiment comprises the second shared wave receiver 139 for removing the desired wave signal from the diversity input signal in order to obtain the shared wave with high accuracy, in addition to the configuration of the diversity receiver of the first embodiment.

A description will now be given to the operation.

According to the output information signal output from the desired wave determinator 78, namely the desired wave demodulator, in the desired wave receiver 79, the modulator 125 in the second shared wave receiver 139 outputs the modulated signal. This modulated signal is inputted to the transmission simulators 126 and 127 in order to reproduce the diversity signal received by the diversity antennas. The coefficient of each of the transmission simulators 126 and 127 is made by using the inverse matrix of the coefficient of the desired wave equalizers 75 and 76, respectively. This process is executed by the microprocessor.

In the diversity receiver of the fourth embodiment, the desired waves transmitted from the desired wave receiver 79 through the transmission path simulators 126 and 127 are subtracted by the adders 123 and 124 with the delayed signal obtained by the delay elements 121 and 122. Accordingly, the desired wave output from the desired wave receiver 79 is considered to be the shared wave. Then, the second shared wave that is obtained from the signal obtained by the subtraction process of the adders 123 and 124 is correlated and detected by the correlators 128 and 129. This second shared wave is equalized by the equalizers 130 and 131 and then provided to outside as the second shared wave information 2 after through the adder 132 and the determinator 133.

As described above, according to the fourth embodiment, because the shared wave canceller 69 and the shared wave receiver 139 are incorporated, it can be achieved that the desired wave receiver 79 receives the desired wave signal with high accuracy and the shared wave signal in which the interference caused by the desired wave has been removed can be obtained by the second shared wave receiver 139. This causes to realize the high accuracy radio communication. Furthermore, it can be achieved to give a means possible to avoid occurrences of the system down caused by the failure of the transmission power control in the mobile station 1 as the most serious defect included in CDMA method. Specifically, the base station incorporating the diversity receiver has the effect that can avoid the occurrence of the system down.

Embodiment 5

Figure 10:
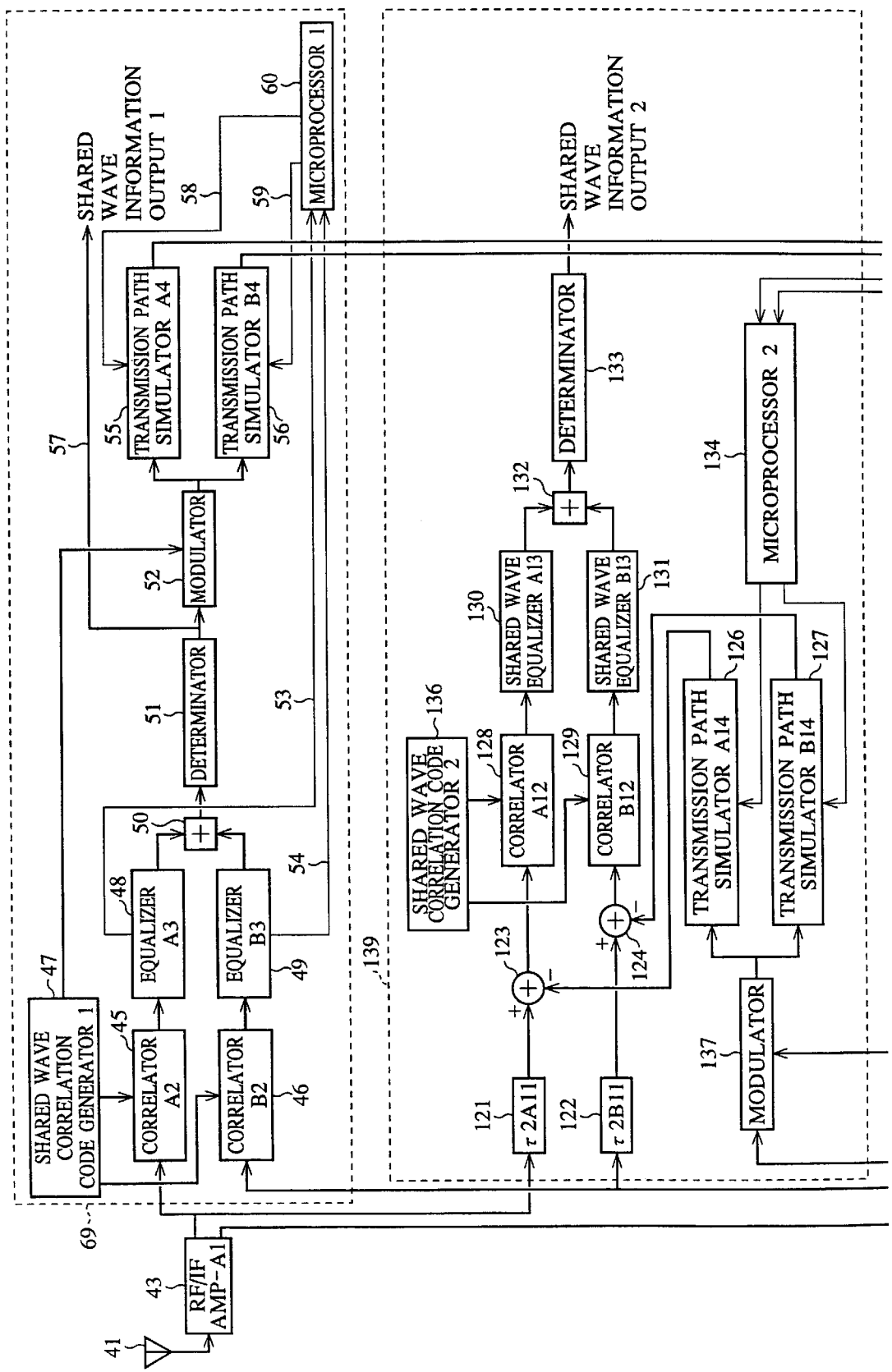
FIGS. 10 and 11 are block diagrams showing a diversity receiver according to the fifth embodiment of the present invention.
Figure 11:
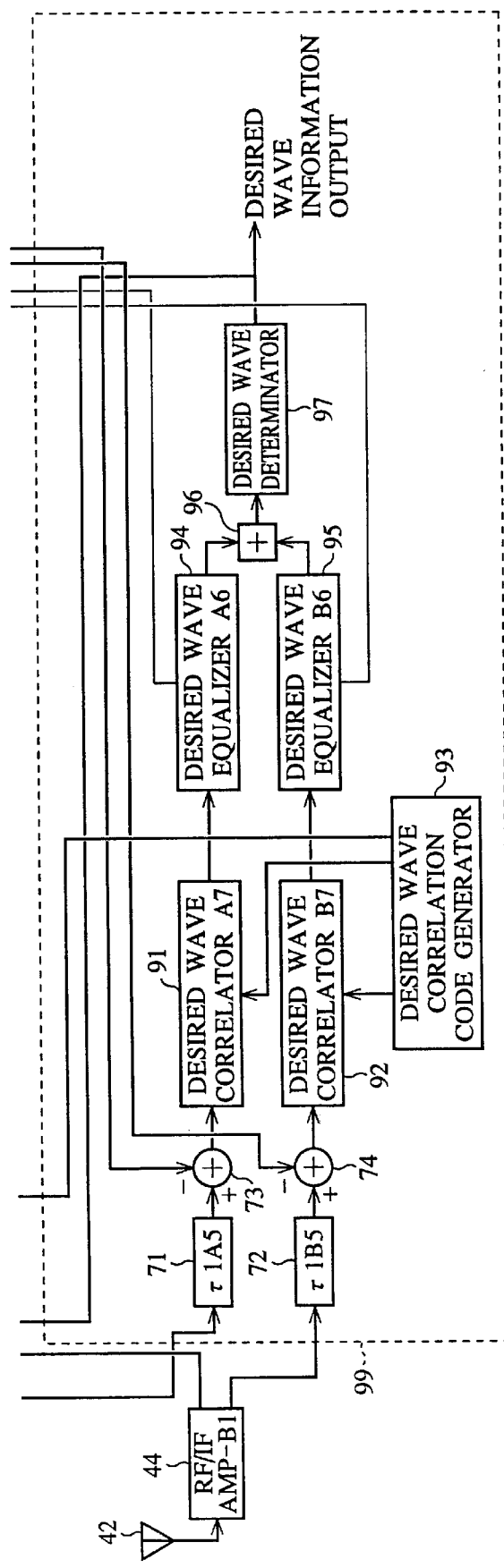

FIGS. 10 and 11 are block diagrams showing a diversity receiver according to the fifth embodiment of the present invention. In the diagrams, 69 designates the shared wave canceller, 139 denotes the second shared wave receiver, and 99 indicates the desired wave receiver.

The diversity receiver of the embodiment 5 is applied to the case that the shared wave and the desired wave are CDMA signals or TD-CDMA signals. Specifically, the shared wave canceller 69 and the desired wave receiver 99 are same in configuration as those in the embodiment 2, therefore the explanation of them is omitted.

In the shared wave receiver 139, the desired wave information output from the desired wave determinator 97 in the desired wave receiver 99 is inputted to the modulator 137. The CDMA diffusion code series signal of the desired wave is transmitted from the desired wave correlation code generator 93 to the modulator 137 in the shared wave receiver 139. The reproduced CDMA signal or the TD-CDMA signal is added with the transmission path distortion by the transmission path simulators 126 and 127, and then the inverted value thereof is inputted to the adders 123 and 124. By the adders 123 and 124, the desired wave signal output from the transmission path simulators 126 and 127 is removed from the input signal delayed by a predetermined time period by the delay elements 121 and 122. The delay time period of the delay elements 121 and 122 are times that are the sum of the delay time of the delay elements 71 and 72 in the desired wave receiver 99 and the delay time in the desired wave receiver 99, that is, the delay time is the signal processing time period from the adders 73 and 74 to the desired wave determinator 97.

The processing time of the desired wave receiver 99 is set to the time period of an integral multiple of the clock time whose unit is the information transmission speed, the symbol clock rate, of the reciprocal of an integral multiple of the clock time, or of a combination of them. Thereby, it can be easily to fit the delay time of the delay elements 121 and 122 by using the unit of the symbol rate. Specifically, the operations of other configuration components in the second shared wave receiver 139 such as the adders 123, 124, the microprocessor 134, the shared wave equalizers 130, 131, the adder 132, the shared wave determinator 133 and the like, for example, are same as those in the second shared wave receiver 139 of the fourth embodiment, therefore the explanation of them is omitted here.

As described above, according to the fifth embodiment, because the shared wave canceller 69 and the shared wave receiver 139 are incorporated, it can be achieved that the desired waves are received with high accuracy and the shared wave signals in which the interference caused by the desired wave has been removed are obtained. Furthermore, it can be achieved to give a means possible to avoid occurrences of the system down caused by the failure of the transmission power control in the mobile station 1 as the most serious defect included in CDMA method. Specifically, the base station incorporating the diversity receiver has the effect that can avoid the occurrence of the system down.

Embodiment 6

Figure 12:
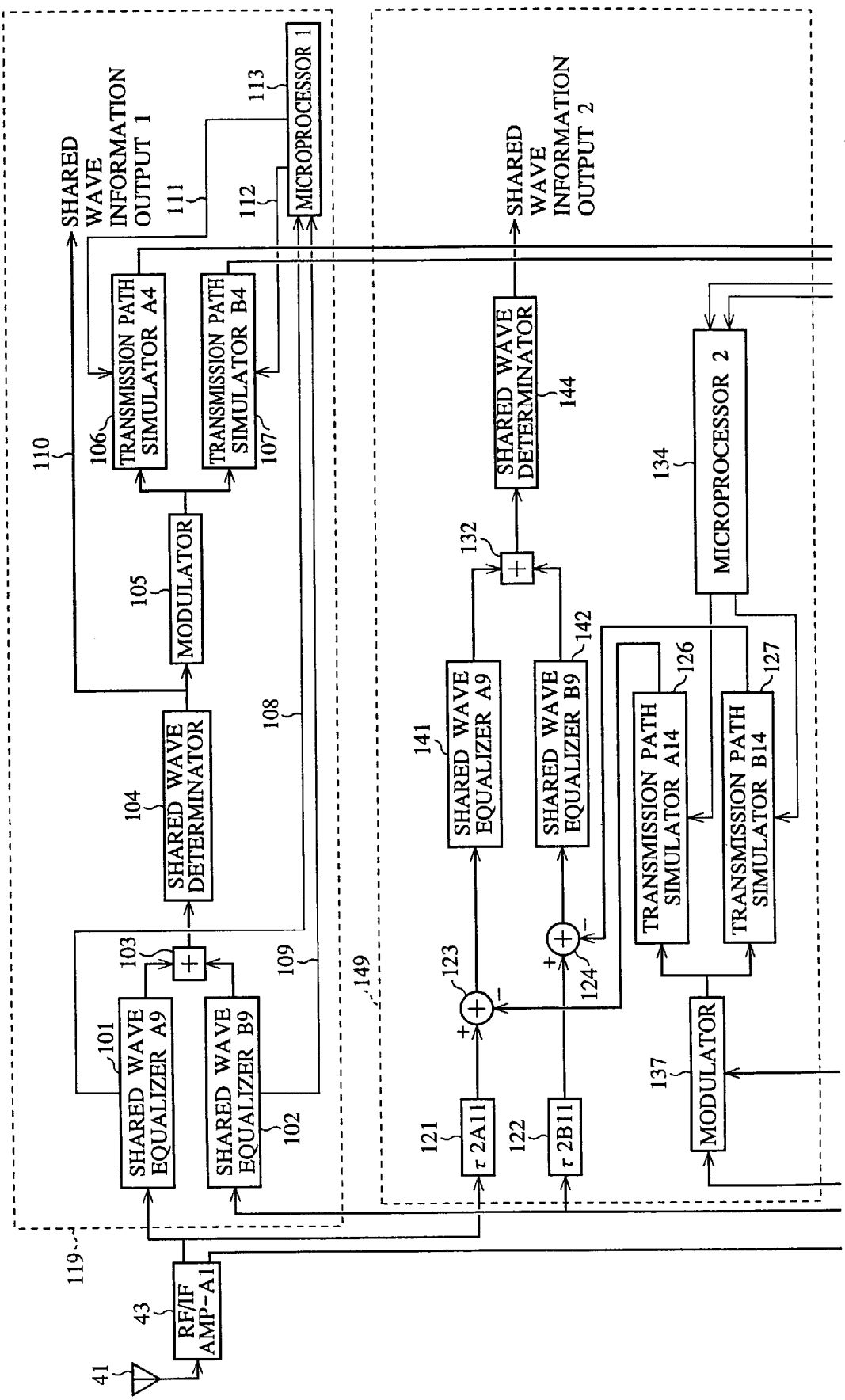
FIGS. 12 and 13 are block diagrams showing a diversity receiver according to the sixth embodiment of the present invention.
Figure 13:
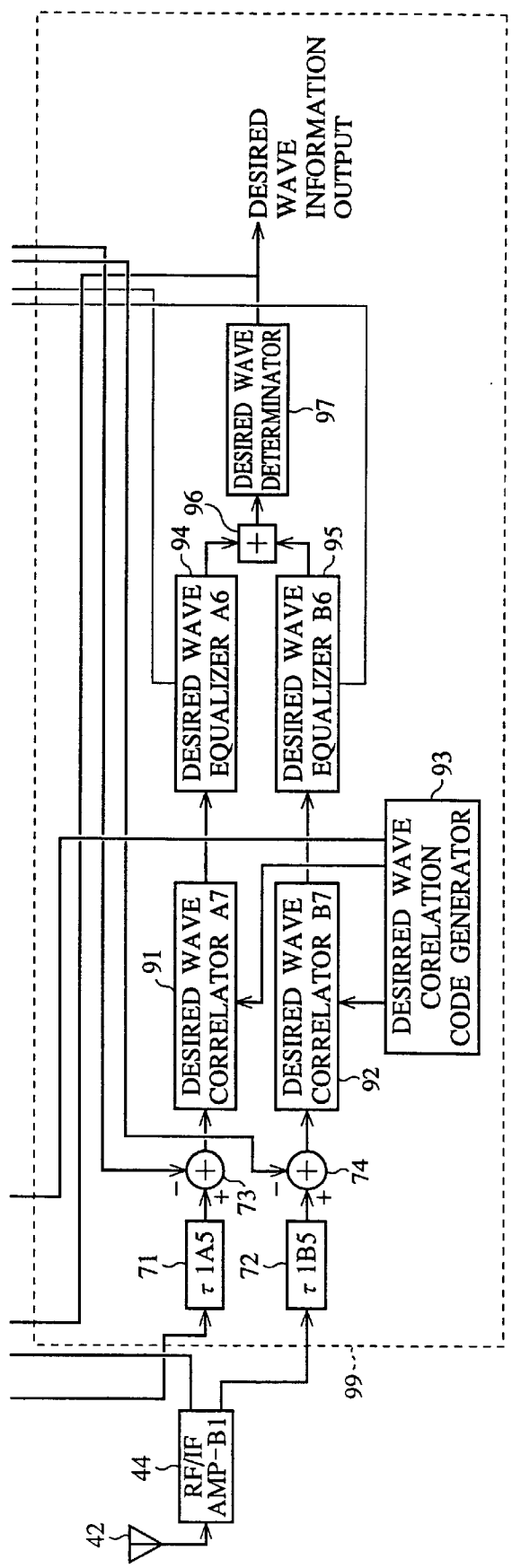

FIGS. 12 and 13 are block diagrams showing a diversity receiver according to the sixth embodiment of the present invention. In the diagrams, 119 designates the shared wave canceller, 149 denotes the second shared wave receiver, 99 indicates the desired wave receiver. Specifically, the shared wave canceller 119 is the same in configuration as that of the embodiment 3 and the desired wave receiver 99 is the same in configuration as that of the embodiment 2, therefore the explanation of them is omitted.

The diversity receiver of the sixth embodiment is applied to the case in which the desired wave is the CDMA signal or the TD-CDMA signal. This diversity receiver can receive this desired wave. In addition to this function, it can remove the CDMA desired wave signal output from the desired wave receiver 99 from the input signal received by the diversity antennas 41 and 42 and gets the FDMA/TDMA shared wave signal with high accuracy.

A description will now be given of the operation.

Because the processing time period (delay time period) of the FDMA/TDMA shared wave canceller 119 has a value that is different from the processing time (namely, the delay time) of the shared wave canceller 69 for the CDMA signal or TD-CDMA signal used in the fourth embodiment shown in FIGS. 8 and 9 and also used in the fifth embodiment shown in FIGS. 10 and 11, the delay time of each of the delay elements 71 and 72 in the desired wave receiver 99 is different from the delay time of each of the delay elements 71 and 72 in the desired wave receivers 79 and 99 of the fourth and fifth embodiments.

Therefore, the delay time period of each of the delay elements 71 and 72 in the desired wave receiver 99 is changeable corresponding to the processing time period of the shared wave canceller 119. When the delay time period of each of the delay elements 71 and 72 is changed, it is changed per integral multiple or the data symbol clock or per reciprocal of an integral multiple of the data symbol clock.

Specifically, the operations of other components in the second shared wave receiver 149, for example, the adders 123 and 124, the microprocessor 134, the shared wave equalizers 141 and 142, the adder 143, the shared wave determinater 144 are same as those in the shared wave receiver 139 of the fourth embodiment, therefore, the explanation of them is omitted here.

As described above, according to the embodiment 6, because the shared wave canceller 119 and the shared wave receiver 149 and the desired wave receiver 99 are incorporated, it can be achieved that the desired wave can be received with high accuracy and the shared wave information in which the interference caused by the desired wave has been removed can be obtained. This causes to realize the radio communication with high quality.

Embodiment 7

Figure 14:
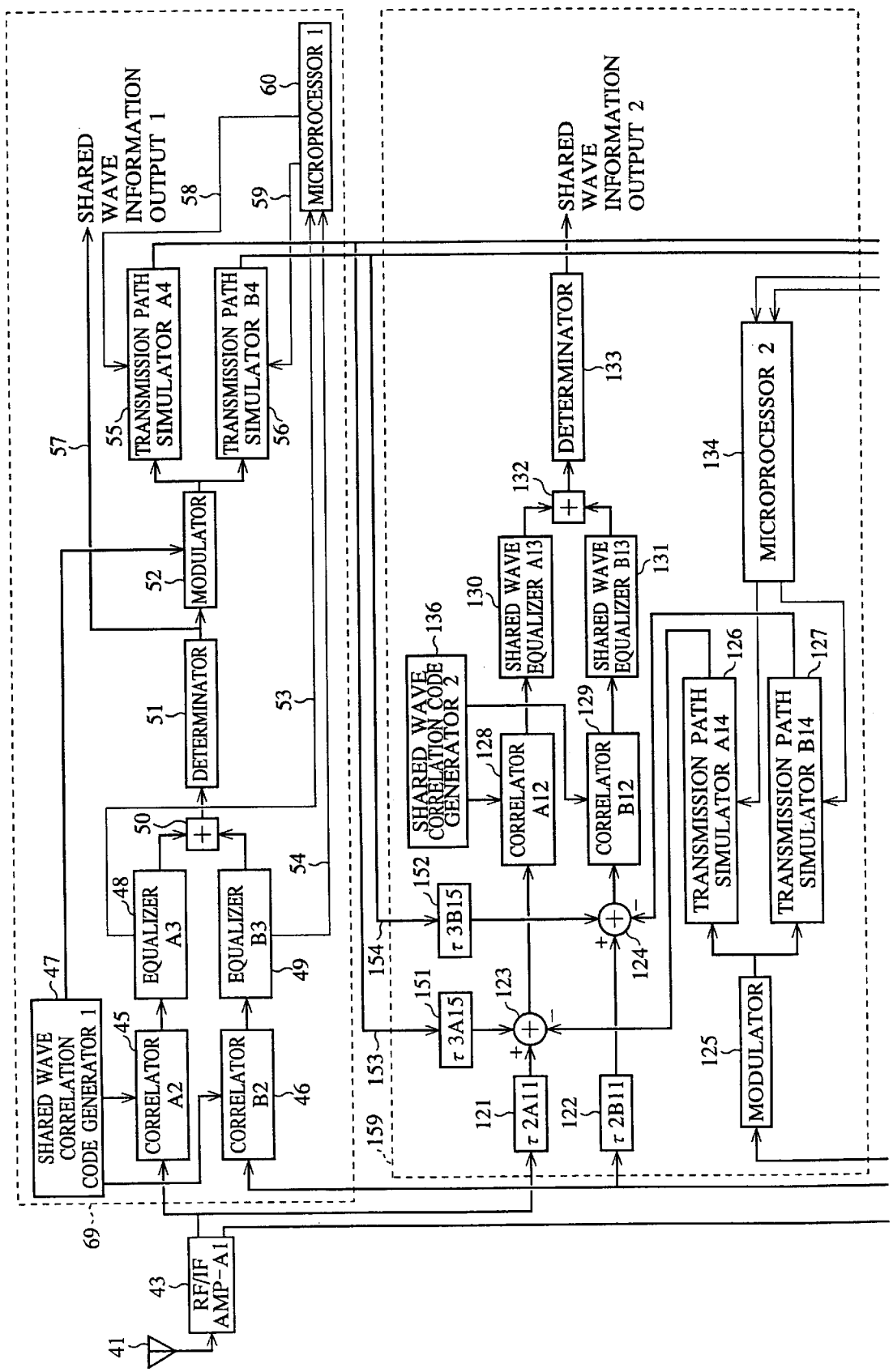
FIGS. 14 and 15 are block diagrams showing a diversity receiver according to the seventh embodiment of the present invention.
Figure 15:
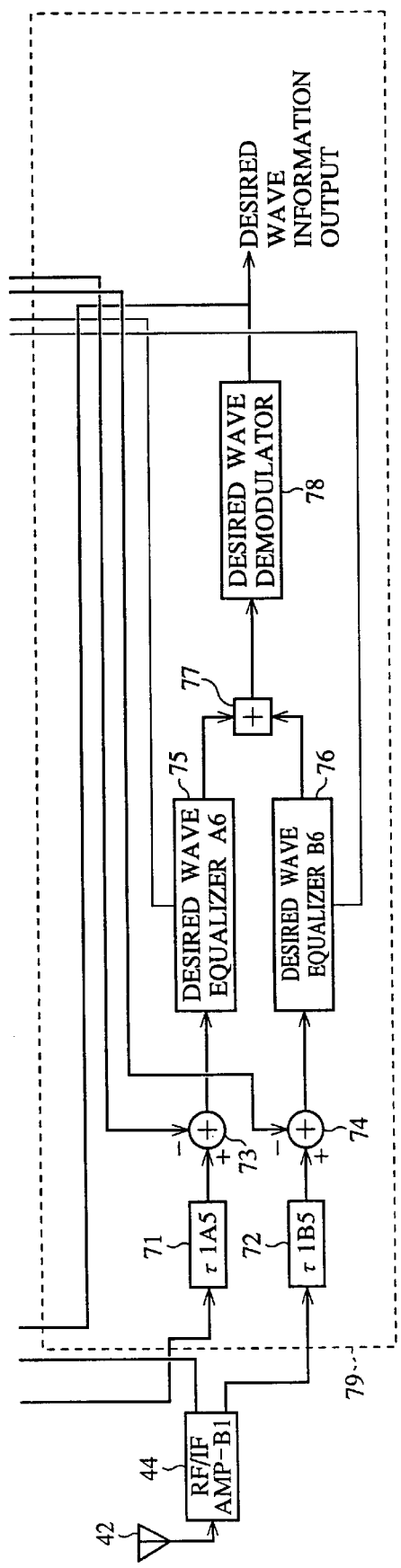

FIGS. 14 and 15 are block diagrams showing a diversity receiver according to the seventh embodiment of the present invention. In the diagrams, 69 designates the shared wave canceller, 79 denotes the desired wave receiver, 159 indicates the second shared wave receiver. Specifically, the shared wave canceller 69 and the desired wave receiver 79 are same as those used sin the first embodiment, therefore the explanation for them is omitted here.

The diversity receiver of the embodiment 7 removes the CDMA desired wave signal output from the desired wave receiver 79 and the FDMA/TDMA shared wave signal output from the shared wave canceller 69 from the input signal received by the antennas 41 and 42 in order to get the second shared wave signal with high accuracy.

A description will now be given of the operation.

The output signal of the shared wave canceller 69 is given to the second shared wave receiver 159 through the transmission paths 153 and 154. The delay elements 151 and 152 in the second shared wave receiver 159 delay the shared wave reproduced signal by the sum of the processing time required in the adders 73 and 74, the equalizers 75 and 76, the adder 77, the determinator 78, the modulator 125, and the transmission simulators 126 and 127 in the desired wave receiver 79 and the canceller 159. Other operations are same as those of the diversity receiver of the fourth embodiment.

The delay time period of the delay elements 151 and 152 in the second shared wave receiver 159 can be set to an integral multiple of the data symbol rate clock, the reciprocal of an integral multiple, or the combination of them. Furthermore, the sum of the processing time of the adders 73 and 74, the equalizers 75 and 76, the adder 77, the determinator 78, the modulator 125, and the transmission path simulators 126 and 127 in the desired wave receiver 79 can also be set to an integral multiple of the data symbol rate clock, the reciprocal of an integral multiple, or a combination of them. The setting of this delay time period and the processing time can be easily set by using a combination of the hardware (H/W) and a software (S/W).

Specifically, for example, the operations of other configuration components in the second shared wave receiver 159, such as the adders 123, 124, the microprocessor 134, the shared wave equalizers 130, 131, the adder 132, and the shared wave determinator 133 are same as those in the second shared wave receiver 139 of the embodiment 4, therefore the explanation for them is omitted.

As described above, according to the embodiment 7, because the shared wave canceller 69 and the shared wave receiver 159 and the desired wave receiver 79 are incorporated, it can be achieved that the desired wave can be received with high accuracy and the shared wave information in which the interference caused by the desired wave has been removed can be obtained. This causes to realize the radio communication with high quality. According to the embodiment 7, there is the effect that when the desired wave signal output from the desired wave receiver 79 is the interference wave to the second shared wave signal, this desired wave signal as the interference wave can be removed with high accuracy. That is, the desired wave signal in addition to the first shared wave signal can be removed simultaneously, so that there is the effect that the shared wave receiver 159 can receive the second shared wave signal with high accuracy.

Embodiment 8

Figure 16:
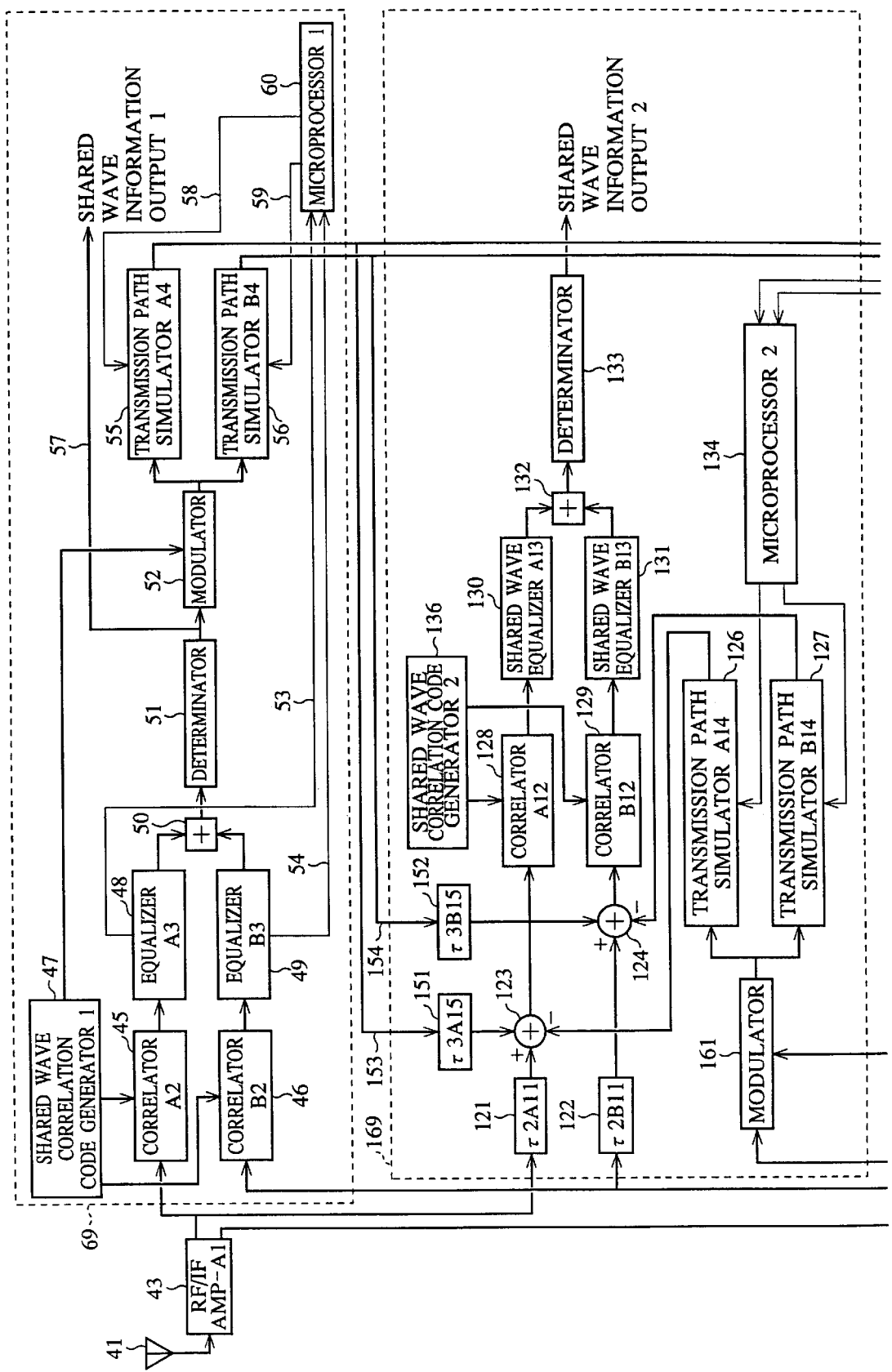
FIGS. 16 and 17 are block diagrams showing a diversity receiver according to the eighth embodiment of the present invention.
Figure 17:
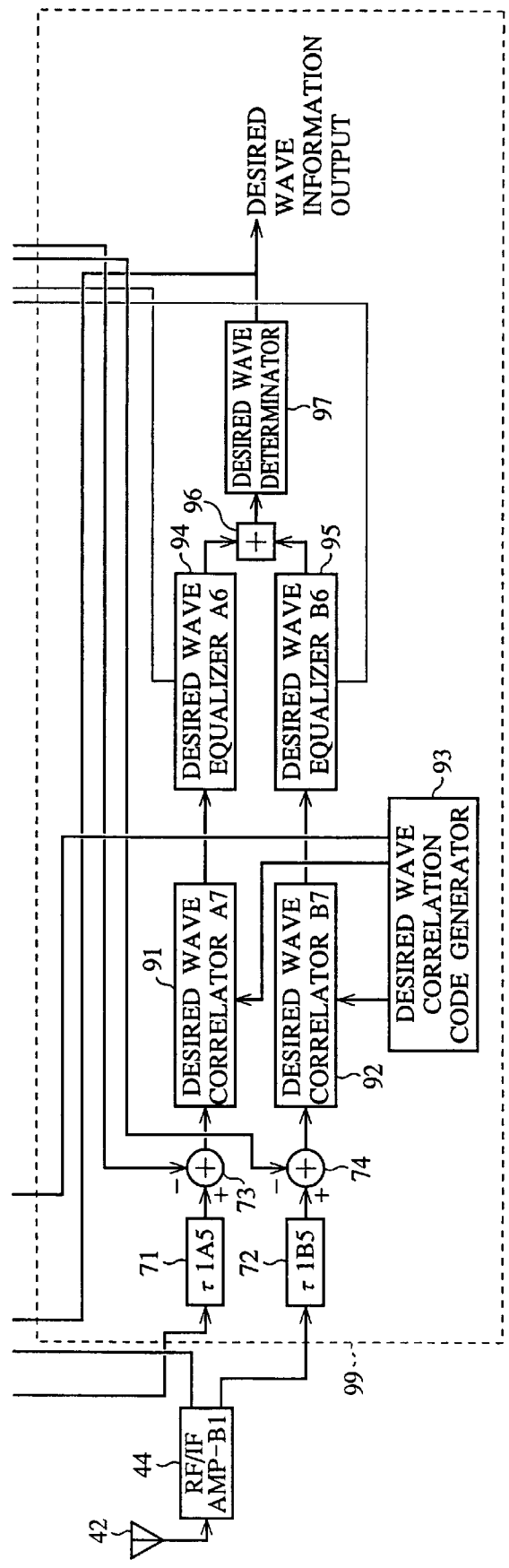

FIGS. 16 and 17 are block diagrams showing a diversity receiver according to the eighth embodiment of the present invention. In the diagrams, 69 designates the shared wave canceller, 99 denotes the desired wave receiver, 169 indicates the second shared wave receiver. Specifically, the shared wave canceller 69 is same as that used in the embodiment 1, and the desired wave receiver 99 is same as that in the embodiment 2, therefore the explanation for them is omitted here.

The diversity receiver of the embodiment 8 removes the CDMA desired wave signal output from the desired wave receiver 99 and the CDMA shared wave signal output from the shared wave canceller 69 from the input signal received by the antennas 41 and 42 in order to get the second shared wave signal with high accuracy. When the second shared wave signal is received, the diversity receiver of the embodiment 8 can use the signal obtained by subtracting the first shared channel signal wave with the second shared wave signal. However, the diversity receiver of the embodiment 8 can be applied to the cases when both of the desired wave and the shared wave are the CDMA signals, or the TD-CDMA signal, or the combination of them. Further, the phase of the canceller signal to be subtracted is matched to the phase of the shared wave in order to increase the accuracy of the canceling operation.

A description will now be given of the operation.

The delay time period of the delay elements 151 and 152, incorporated in the second shared wave receiver 169 in order to delay the shared wave signal obtained by the shared wave canceller 69 by a predetermined delay time period, can be set to an integral multiple of the data symbol rate clock, the reciprocal of an integral multiple of the symbol clock rate, or the combination of them. Furthermore, the sum of the processing time from the adders 73 and 74, the correlators 91 and 92, the desired wave equalizers 94 and 95, the adder 96, the desired wave determinator 97 in the desired wave receiver 99 to the modulator 161 and the transmission path simulators 126 and 127 in the second shared wave receiver 169 can also be set to an integral multiple of the data symbol rate clock, the reciprocal of an integral multiple of the symbol clock rate, or the combination of them.

Specifically, for example, the operations of other configuration components in the second shared wave receiver 169, for example, the adders 123 and 124, the microprocessor 134, the shared wave equalizers 130 and 131, the adder 132, and the shared wave determinator 133 are same as those used in the second shared wave receiver 139 of the embodiment 4, therefore the explanation of them is omitted here.

As described above, according to the embodiment 8, the desired wave signal can be received correctly and the shared wave information without interference from the desired wave can be obtained, so that it is achieved to realize the high accuracy radio communication. Specifically, since the desired wave signal in addition to the first shared wave signal are removed simultaneously, it is possible to get the effect that the second shared wave signal can be received with high accuracy. When the desired wave signal output from the desired wave receiver 99 is the interference wave to the second shared wave signal, the desired wave signal as the interference wave can be removed with high accuracy. Furthermore, when the delay time period of the plurality of delay elements is an integral multiple of the data symbol clock or a reciprocal of an integral multiple or a combination of them, the adjustment process of the total delay time can be easily performed. In addition, it is easily performed to set various time condition in the system by matching the delay time or the initial time of the processing time period to the initial time of the time slot when the time-slotted TD-CDMA signal is used instead of the continuous CDMA signal. By using the TD-CDMA signal, it is easily processed to set various delay time periods in the system.

Embodiment 9

Figure 18:
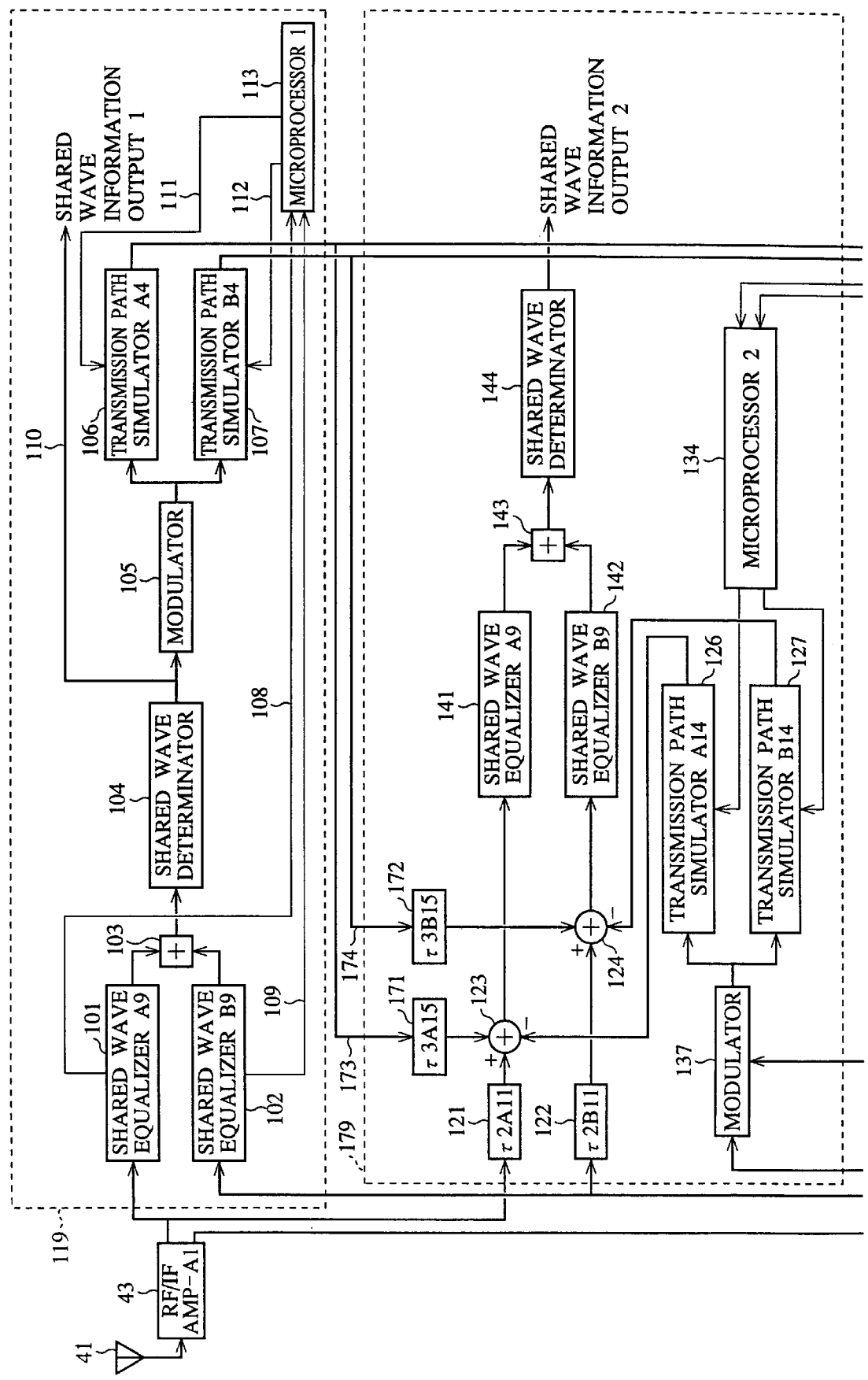
FIGS. 18 and 19 are block diagrams showing a diversity receiver according to the ninth embodiment of the present invention.
Figure 19:
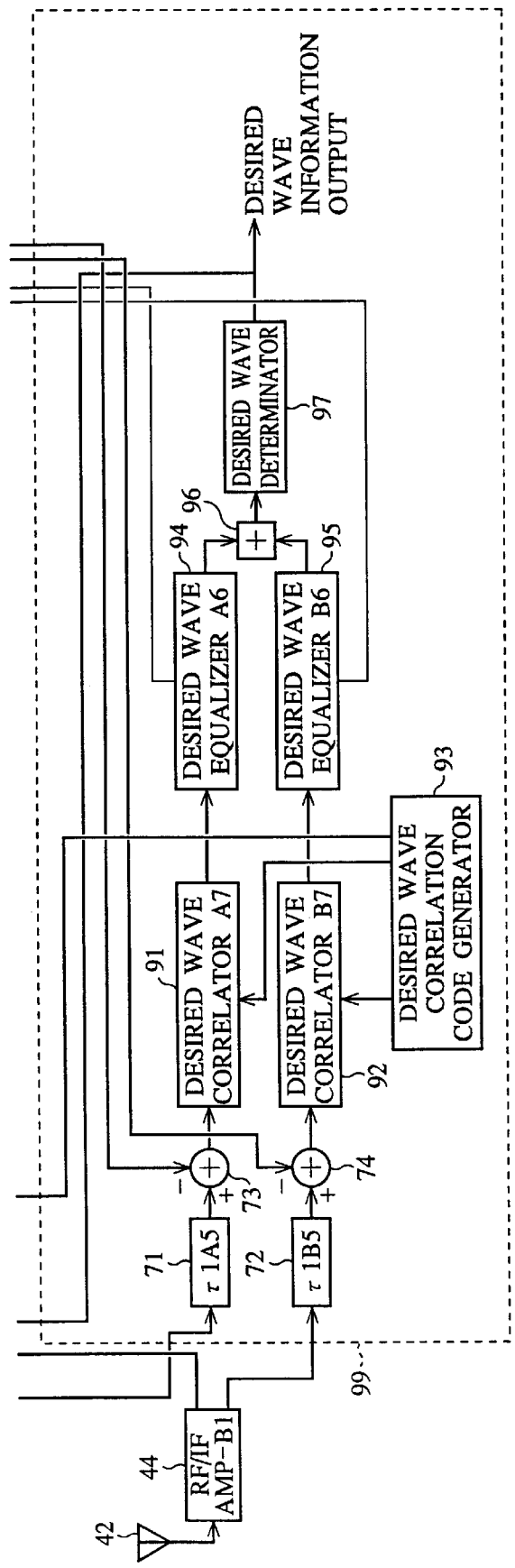

FIGS. 18 and 19 are block diagrams showing a diversity receiver according to the ninth embodiment of the present invention. In the diagrams, 119 designates the shared wave canceller, 99 denotes the desired wave receiver, 179 indicates the second shared wave receiver. Specifically, the shared wave canceller 119 is same as that of the embodiment 3, and the desired wave receiver 99 is same as that of the embodiment 2, therefore the explanation of them is omitted here.

The diversity receiver of the embodiment 9 removes the CDMA desired wave signal output from the desired wave receiver 99 and the FDMA/TDMA shared wave signal output from the shared wave canceller 119 from the input signal received by the diversity antennas 41 and 42 in order to obtain the second shared wave signal accurately.

A description will now be given of the operation.

The delay time of each of the delay elements 171 and 172 in the second shared wave receiver 179 is set to an integral multiple of a data symbol rate clock, a reciprocal of an integral multiple, or a combination of them. Furthermore, the sum of the processing of the adders 73 and 74, the Correlator 91 and 92, the desired wave equalizers 94 and 95, the adder 96, the desired wave determinator 97 in the desired wave receiver 99, and the modulator 137 and the transmission path simulators 126 and 127 in the second shared wave receiver 179 can also be set to an integral multiple of the data symbol rate clock, the reciprocal of an integral multiple, or a combination of them. The setting of this delay time period and the processing time can be easily set by using a combination of the hardware (H/W) and a software (S/W). Specifically, the operations of other components, for example, the adders 123 and 124, the microprocessor 134, the shared wave equalizers 14L and 142, the adder 143, the shared wave determinater 144 are same as those in the second shared wave receiver 139, therefore the explanation of them is omitted here.

As described above, according to the embodiment 9, the desired wave signals can be received correctly and the shared wave information without interference from the desired waves can be obtained, so that it is achieved to realize the high accuracy radio communication. When the desired wave signal output from the desired wave receiver 99 is the interference wave to the second shared wave signal, the desired wave signal as the interference wave can be removed with high accuracy. Furthermore, when the delay time period of the plurality of delay elements is an integral multiple of the data symbol clock or a reciprocal of an integral multiple or a combination of them, the adjustment process of the total delay time can be easily performed.

Embodiment 10

Figure 20:
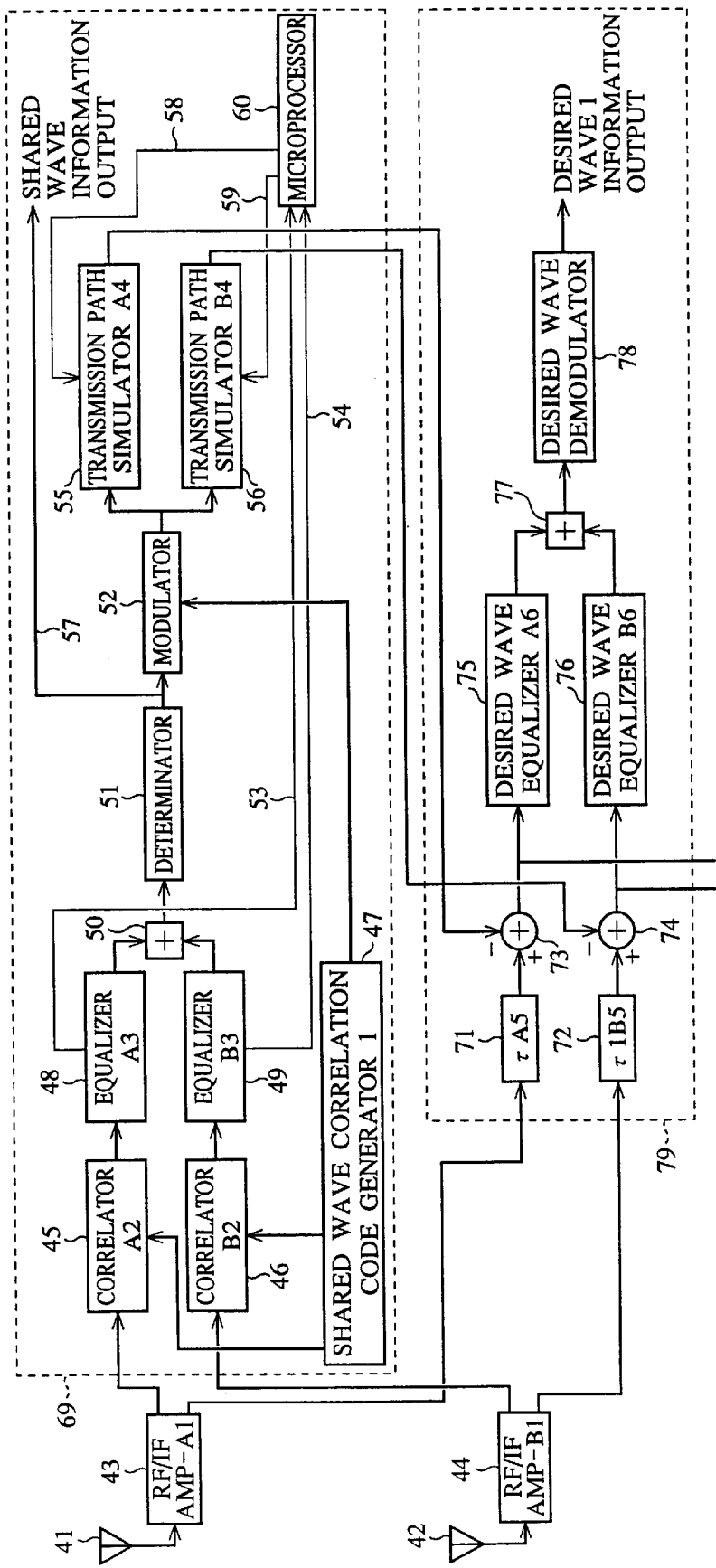
FIGS. 20 and 21 are block diagrams showing a diversity receiver according to the tenth embodiment of the present invention.
Figure 21:
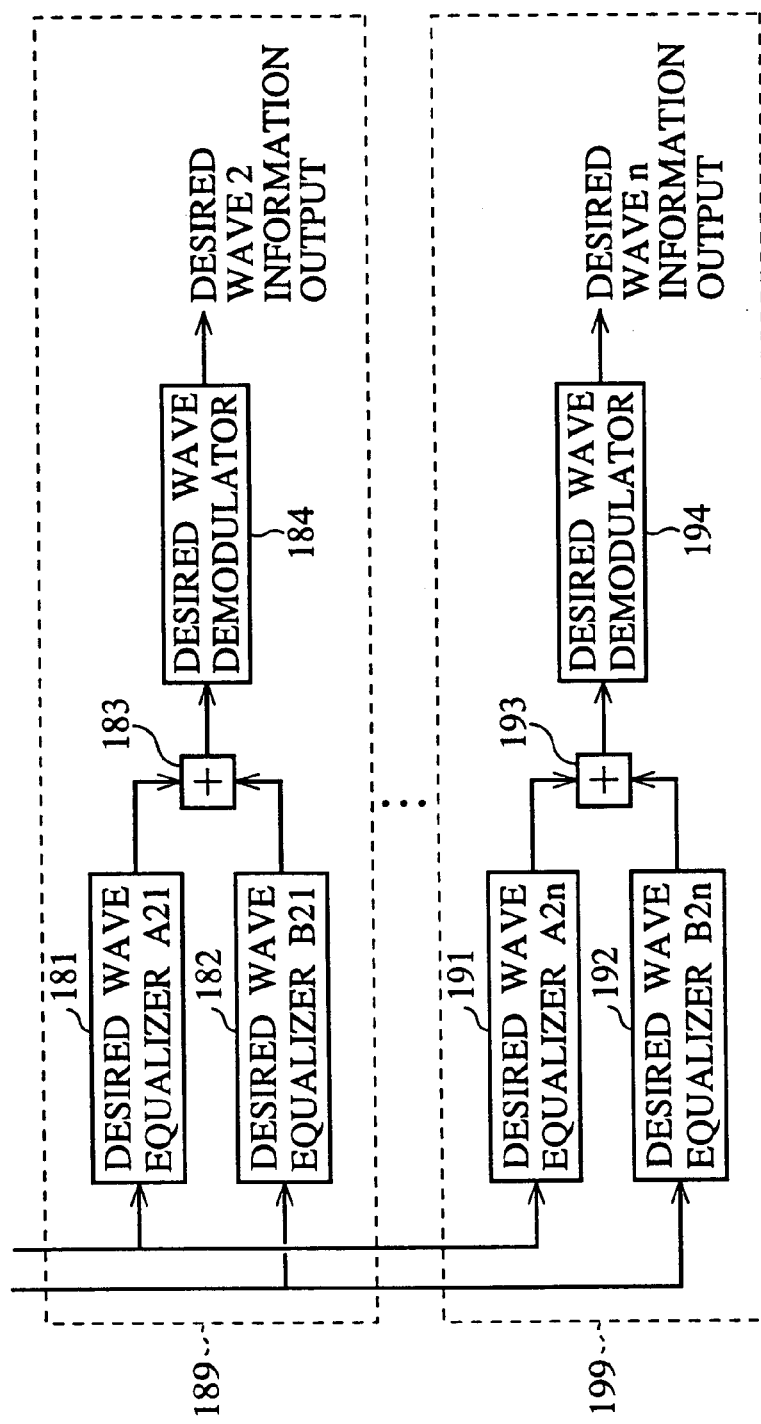

FIGS. 20 and 21 are block diagrams showing a diversity receiver according to the tenth embodiment of the present invention. In the diagrams, 69 designates the shared wave canceller for removing the CDMA signal as the shared wave, and 79, 189, 199 each denotes the desired wave receiver for receiving the FDMA/TDMA signal as the desired wave. Specifically, the shared wave canceller 69 is same as that used in the embodiment 1, and each of the desired wave receivers 79, 189, and 199 is same as the desired wave receiver used in the embodiment 1, therefore the explanation of them is omitted here.

The diversity receiver of the embodiment 10 comprises a plurality of the desired wave receivers for receiving the FDMA/TDMA signal as the desired waves. By this configuration, a plurality of desired waves can be received efficiently with high accuracy.

The shared wave canceller 69 is capable of removing the CDMA signal or the TD-CDMA signal which interferes or jams up to receive the desired wave transmitted to the diversity antennas 41 and 42.

The signal obtained by removing the shared wave signal as the output signal from the shared wave canceller 69 from the input signal transmitted to the diversity antennas 41 and 42, that is, the output signals from the adders 73 and 74 in the desired wave receiver 79 are input to the desired wave equalizers 75 and 76 in the first desired wave receiver 79, the desired wave equalizers 181 and 182 in the second desired wave receiver 189, . . . , the desired wave equalizers 191 and 192 in the n-Th desired wave receiver 199. Each of the desired wave receivers 79, 189, and 199 incorporates the filter for selecting only the FDMA/TDMA signal to be received, so that the target channel signal can be received.

As described above, according to the embodiment 10, because the diversity receiver of the embodiment 10 comprises one shared wave canceller and a plurality of desired wave receivers, there is the effect that it can be applied to the case in which the desired wave signals can be received accurately when the CDMA shared wave has a strong signal power and this CDMA shared wave can be removed. Furthermore, when the diversity receiver of the embodiment 10 is used as a receiver in a base station, the shared wave that is the target signal to be removed can be used efficiently as useful channel information.

Embodiment 11

Figure 22:
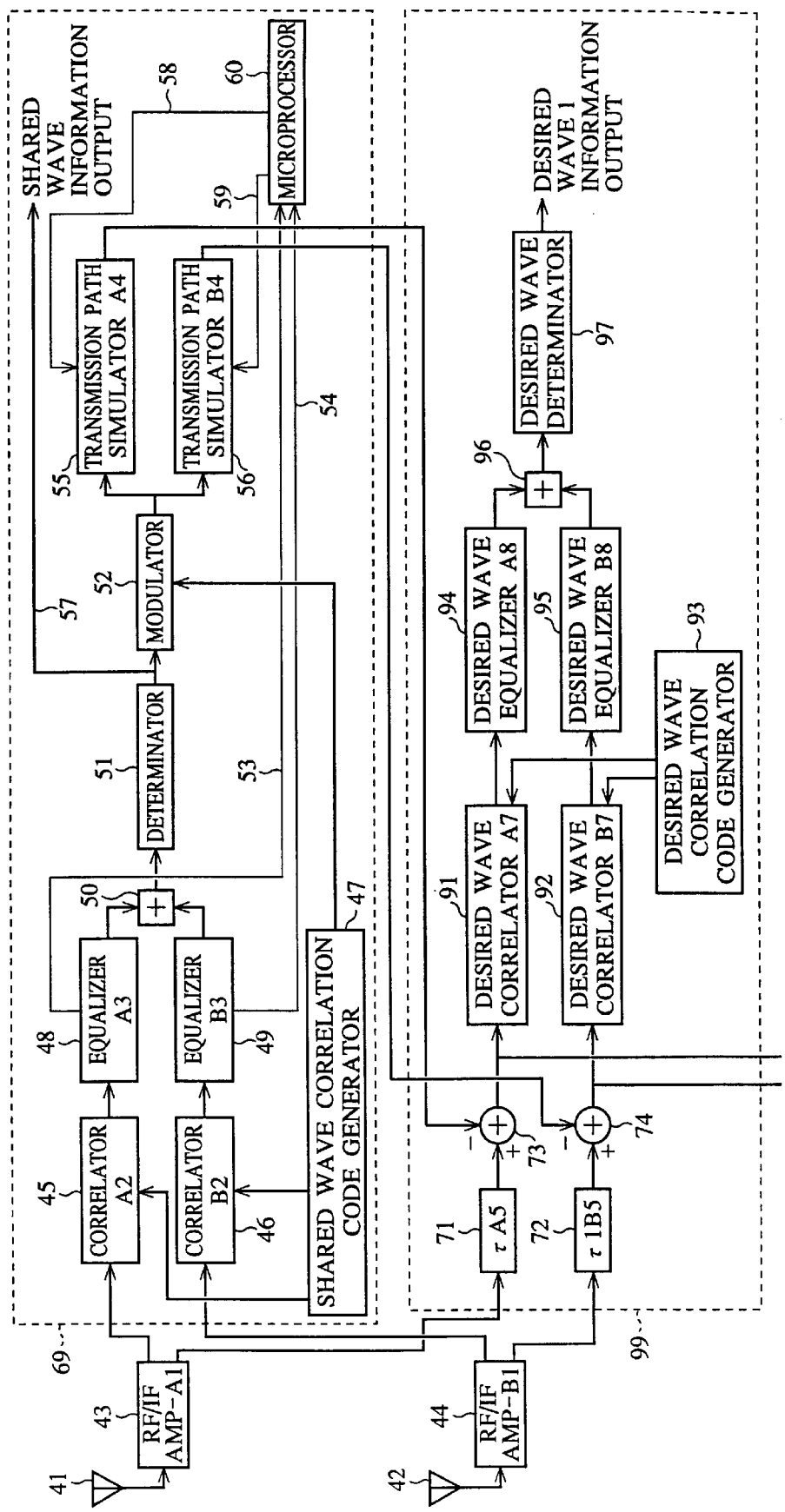
FIGS. 22 and 23 are block diagrams showing a diversity receiver according to the eleventh embodiment of the present invention.
Figure 23:
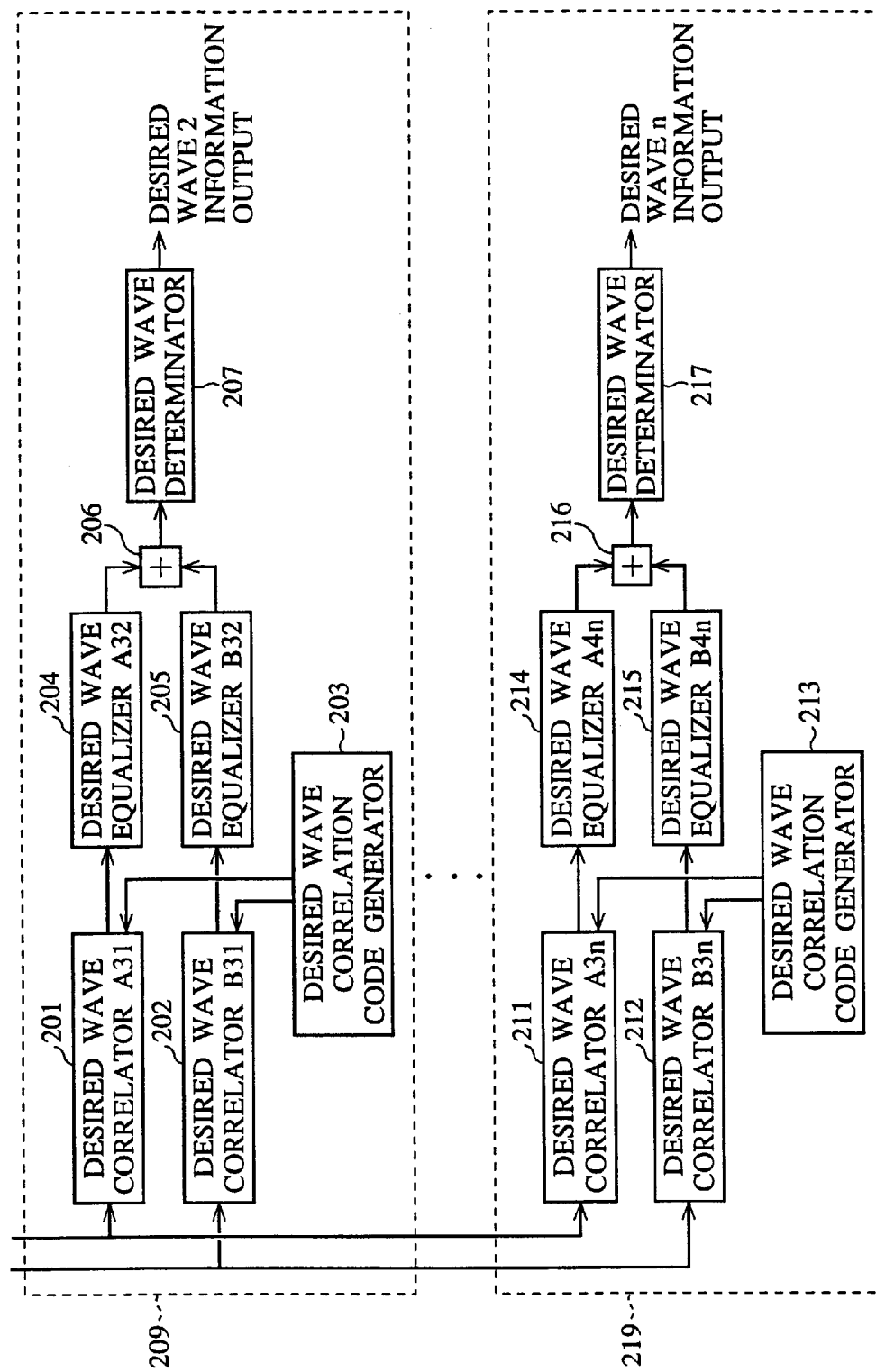

FIGS. 22 and 23 are block diagrams showing a diversity receiver according to the eleventh embodiment of the present invention. In the diagrams, 69 designates the shared wave canceller for removing the CDMA signal as the shared wave, and 99, 209, 219 each denotes the desired wave receiver for receiving the CDMA signal as the desired wave. Specifically, the shared wave canceller 69 is same as that used in the embodiment 1, and each of the desired wave receivers 99, 209, and 219 is same as the desired wave receiver used in the embodiment 2, therefore the explanation of them is omitted here.

The diversity receiver of the embodiment 11 comprises a plurality of the desired wave receivers for receiving the CDMA signal as the desired waves. By this configuration, a plurality of desired waves can be received efficiently with high accuracy.

The shared wave canceller 69 is capable of removing the CDMA signal or the TD-CDMA signal which interferes or jams up to receive the desired wave transmitted to the diversity antennas 41 and 42.

The signal obtained by removing the shared wave signal as the output signal from the shared wave canceller 69 from the input signal transmitted to the diversity antennas 41 and 42, that is, the output signals from the adders 73 and 74 in the desired wave receiver 99 are input to the desired wave correlators 91 and 92, 201 and 202, 211 and 212 in the desired wave receivers 99, 209, 219. Each of the desired wave correlation code generators 93, 203, 213 generates the independent orthogonal code, so that each channel is separated in order to receive the target desired wave signal. The output signals from the desired wave correlators 91 and 92, 201 an 202, 211 and 212 are inputted to the desired wave equalizers 94 and 95 in the first desired wave receiver 99, the desired wave equalizers 204 and 205 in the second desired wave receiver 209,..., the desired wave equalizers 214 and 215 in the n-Th desired wave receiver 219, respectively. Each of the desired wave equalizers in the desired wave receivers 99, 209, and 219 removes the interference from the correlated signal output from each desired wave correlator. The output signals from the desired wave equalizers are added the adder. The desired wave determinator judges the output signal from the adder in order to obtain the target channel signal, so that each desired wave receiver can receive the desired target channel signal.

As described above, according to the embodiment 11, because the diversity receiver of the embodiment 11 comprises one shared wave canceller and a plurality of desired wave receivers, there is the effect that it can be applied to the case in which the desired wave signals can be received accurately when the CDMA shared wave has a strong signal power and this CDMA shared wave can be removed. Furthermore, when the diversity receiver of the embodiment 11 is used as a receiver in a base station, the shared wave that is the target signal to be removed can be used efficiently as useful channel information.

Embodiment 12

Figure 24:
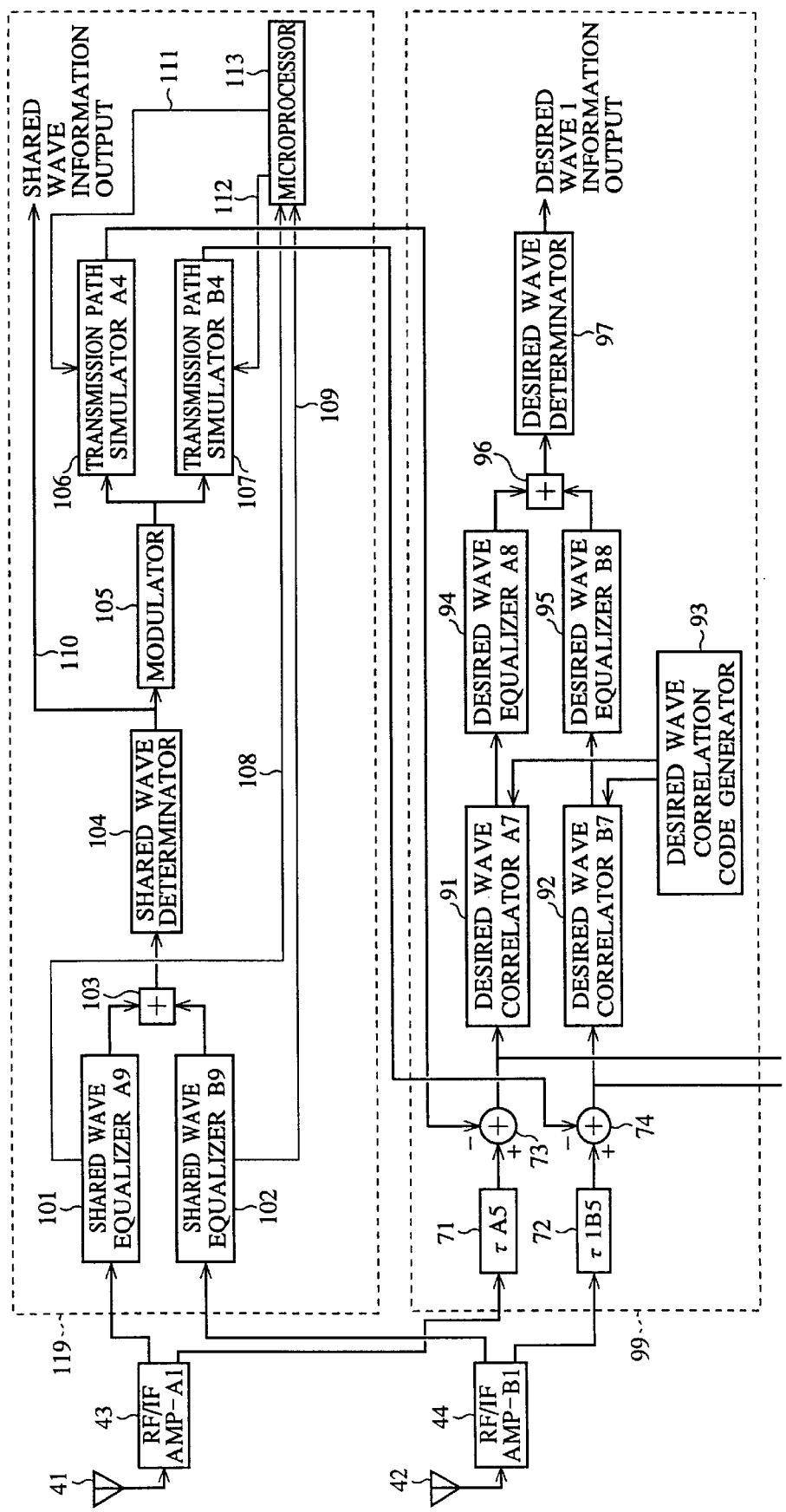
FIGS. 24 and 25 are block diagrams showing a diversity receiver according to the twelfth embodiment of the present invention.
Figure 25:
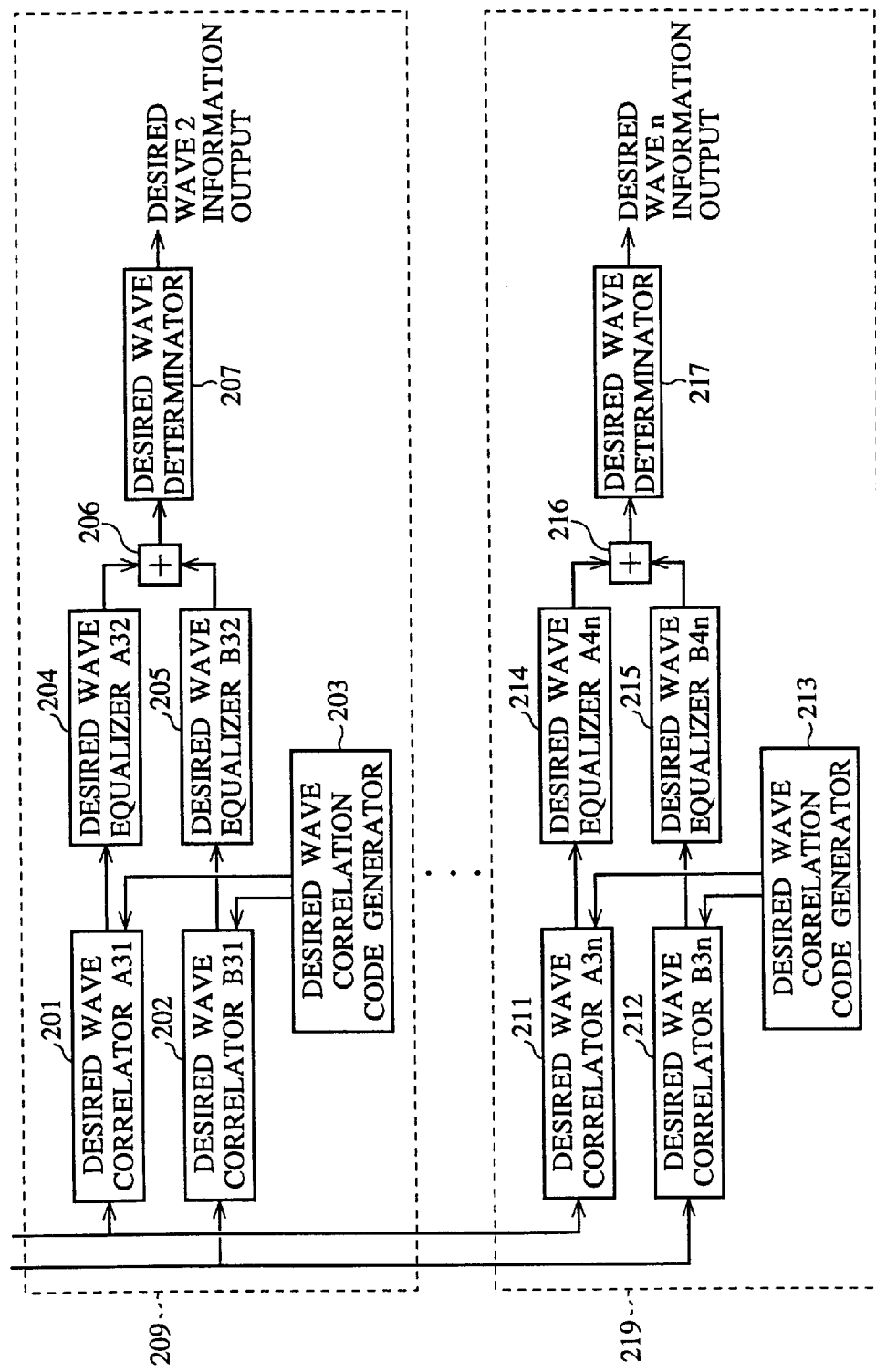

FIGS. 24 and 25 are block diagrams showing a diversity receiver according to the twelfth embodiment of the present invention. In the diagrams, 119 designates the shared wave canceller for removing the FDMA/TDMA signal as the shared wave, and 99, 209, 219 each denotes the desired wave receiver for receiving the CDMA signal as the desired wave. Specifically, the shared wave canceller 119 is same as that used in the embodiment 3, and each of the desired wave receivers 99, 209, and 219 is same as the desired wave receiver used in the embodiment 2, therefore the explanation of them is omitted here.

The diversity receiver of the embodiment 12 comprises a plurality of the desired wave receivers for receiving the CDMA signal as the desired waves. By this configuration, a plurality of desired waves can be received efficiently with high accuracy.

The shared wave canceller 119 is capable of removing the FDMA/TDMA signal which interferes or jams up to receive the desired wave transmitted to the diversity antennas 41 and 42.

The signals obtained by removing the shared wave signals, as the output signals of the shared wave canceller 69, from the input signals transmitted to the diversity antennas 41 and 42, that is, the output signals from the adders 73 and 74 in the desired wave receiver 99 are inputted to the desired wave correlators 91 and 92, 201 and 202, 211 and 212 in the desired wave receivers 99, 209, and 219. Each of the desired wave correlation code generators 93, 203, 213 generates an independent orthogonal code, so that each channel is separated in order to receive the target desired wave signal. The output signals from the desired wave correlators 91 and 92, 201 and 202, 211 and 212 are inputted to the desired wave equalizers 94 and 95 in the first desired wave receiver 99, the desired wave equalizers 204 and 205 in the second desired wave receiver 209, . . . , the desired wave equalizers 214 and 215 in the n-Th desired wave receiver 219, respectively. Each of the desired wave equalizers in the desired wave receivers 99, 209, and 219 removes the interference from the correlated signal output from each desired wave correlator. The output signals from the desired wave equalizers are added to the adder. The desired wave determinator judges the output signal from the adder in order to obtain the target channel signal, so that each desired wave receiver can receive the desired target channel signal.

As described above, according to the embodiment 12, because the diversity receiver of the embodiment 12 comprises one shared wave canceller and a plurality of desired wave receivers, there is the effect that it can be applied to the case in which the desired wave signals can be received accurately when the FDMA/TDMA shared wave has a strong signal power and this FDMA/TDMA shared wave can be removed. Furthermore, when the diversity receiver of the embodiment 12 is used as a receiver in a base station, the shared wave that is the target signal to be removed can be used efficiently as useful channel information.

Embodiment 13

Figure 26:
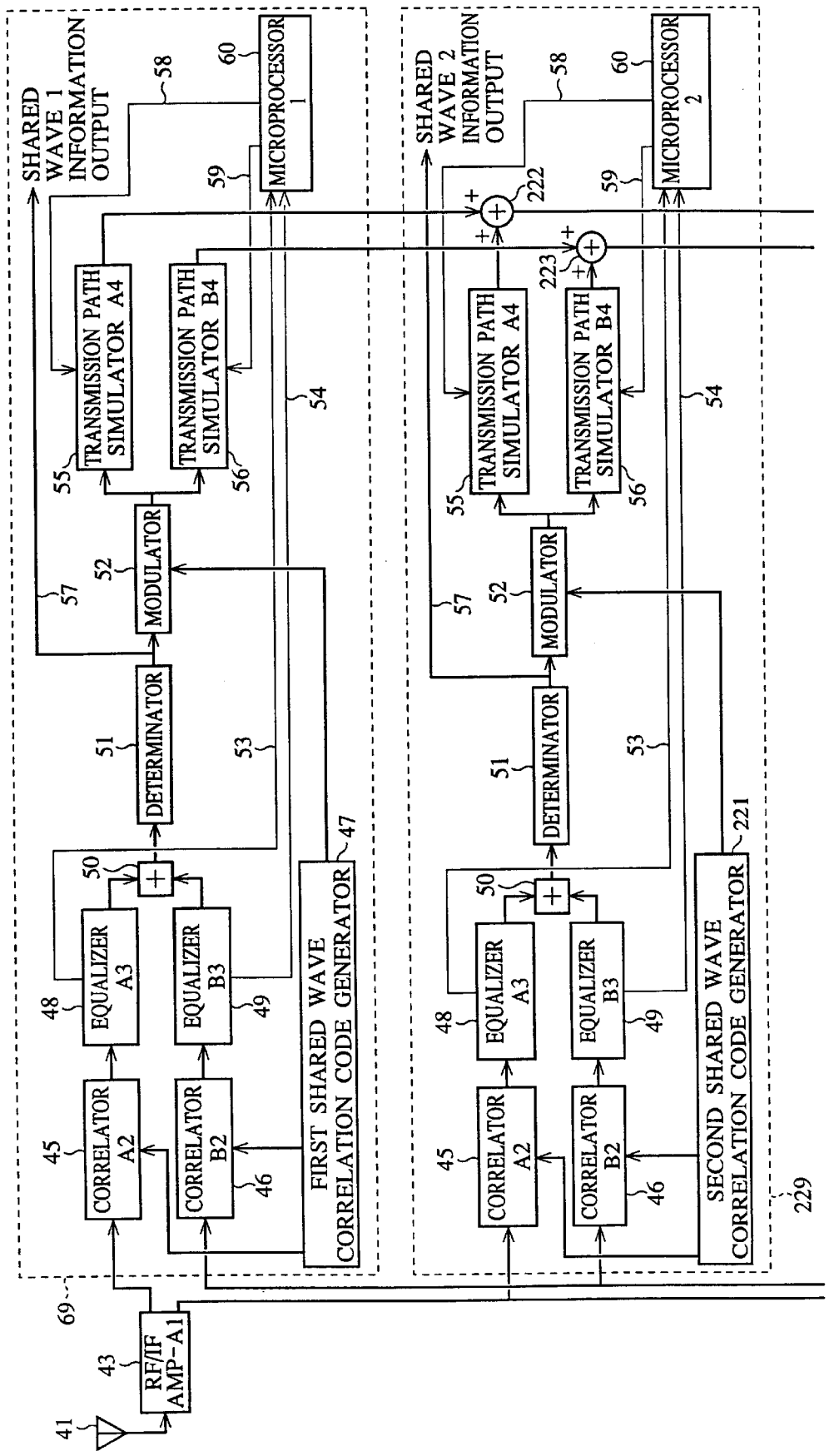
FIGS. 26 and 27 are block diagrams showing a diversity receiver according to the thirteenth embodiment of the present invention.
Figure 27:
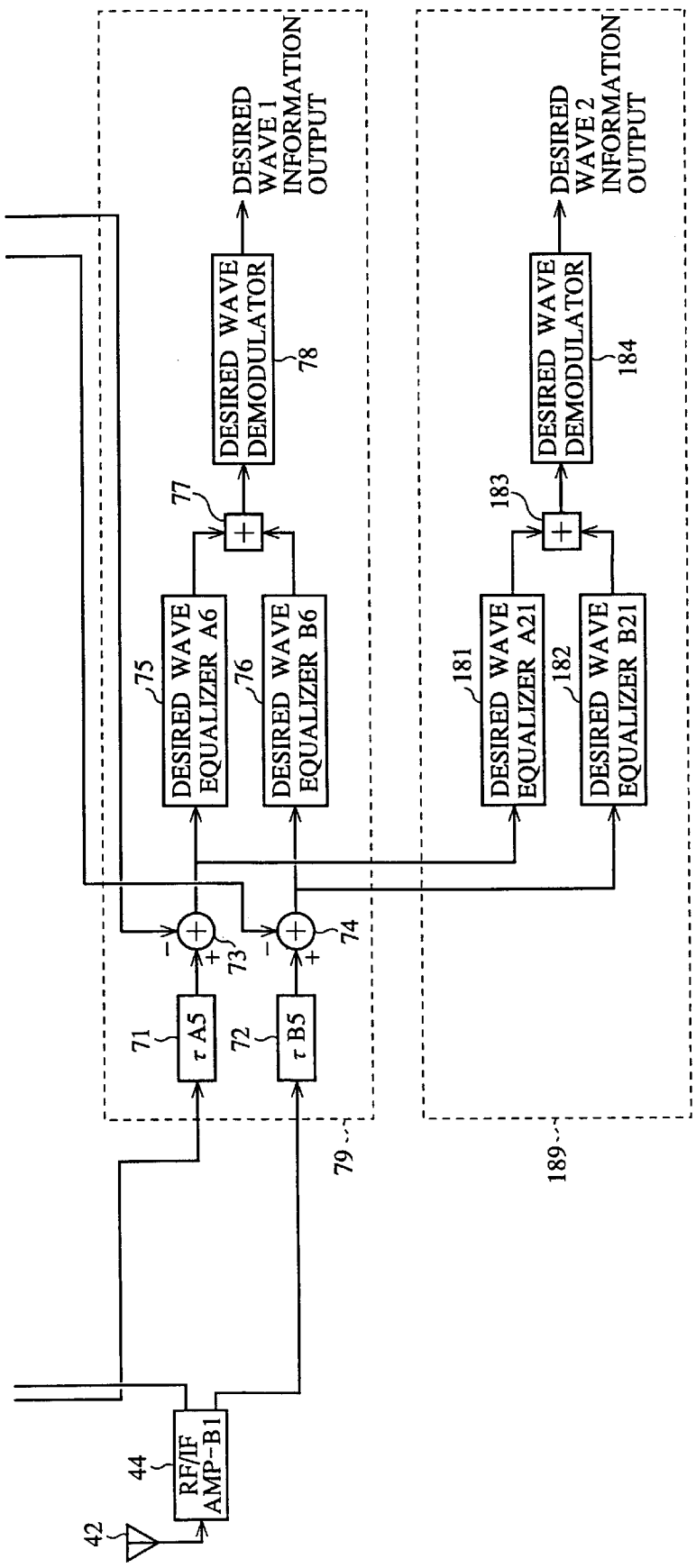

FIGS. 26 and 27 are block diagrams showing a diversity receiver according to the thirteenth embodiment of the present invention. In the diagrams, 69 and 229 designate the shared wave cancellers for removing the CDMA signal or the TD-CDMA signal as the shared wave, and 79 and 189 each denotes the desired wave receiver for receiving the FDMA/TDMA signal as the desired wave. Specifically, each of the shared wave cancellers 69 and 229 is same as that used in the embodiment 1, and each of the desired wave receivers 79 and 189 is same as the desired wave receiver used in the embodiment 1, therefore the explanation of them is omitted here. Furthermore, the configuration and the operation of each of the shared wave cancellers 69 and 229 and the desired wave receivers 79 and 189 forming the diversity receiver of the embodiment 13 are same as those of the embodiment 1 and embodiment 10, therefore, the explanation of them is omitted here.

The diversity receiver of the embodiment 13 can remove each of the shared wave signals simultaneously by using a plurality of shared wave cancellers when there are a plurality of shared wave channels. In addition to this, it can be achieved to increase the function to avoid occurrences of the system down caused by the failure of the transmission power control in the mobile station 1 as the most serious defect included in CDMA method, when the diversity receiver of the embodiment 13 is applied to a receiver in a base station.

Embodiment 14

Figure 28:
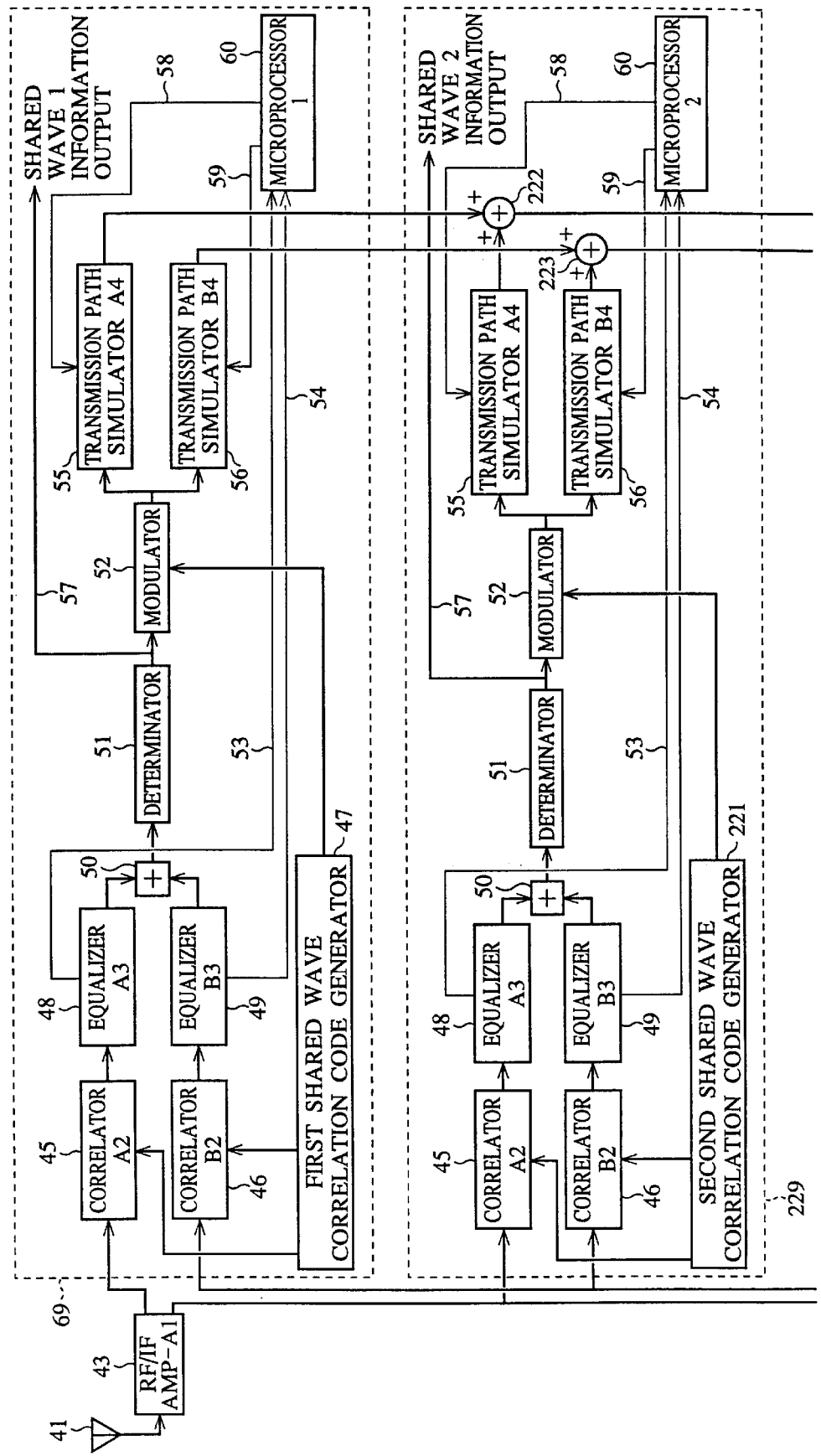
FIGS. 28 and 29 are block diagrams showing a diversity receiver according to the fourteenth embodiment of the present invention.
Figure 29:
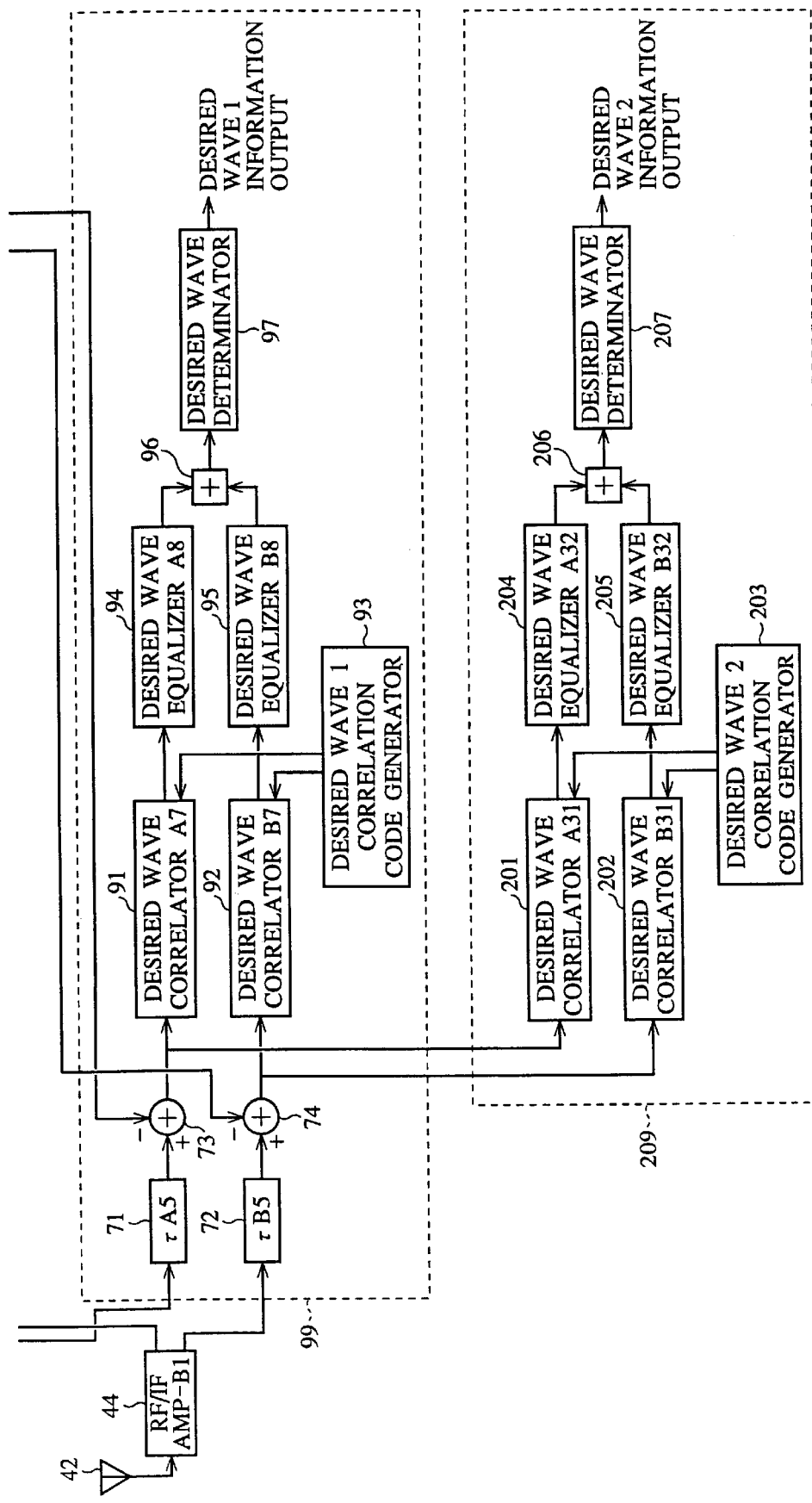

FIGS. 28 and 29 are block diagrams showing a diversity receiver according to the fourteenth embodiment of the present invention. In the diagrams, 69 and 229 designate the shared wave cancellers for removing the CDMA signal or the TD-CDMA signal as the shared wave, and 99 and 209 denote the desired wave receivers for receiving the CDMA signal or the TD-CDMA signal as the desired wave. Specifically, each of the shared wave cancellers 69 and 229 is same as that used in the embodiment 1, and each of the desired wave receivers 99 and 209 is same as the desired wave receiver used in the embodiment 2, therefore the explanation of them is omitted here. Furthermore, the configuration and the operation of each of the shared wave cancellers 69 and 229 and the desired wave receivers 99 and 209 forming the diversity receiver of the embodiment 14 are same as those of the embodiment 1, the embodiment 2, and the embodiment 11, therefore, the explanation of them is omitted here.

The diversity receiver of the embodiment 14 can remove each of the shared wave signals simultaneously by using a plurality of shared wave cancellers when there are a plurality of shared wave channels. In addition to this, it can be achieved to increase the function to avoid the occurrence of a system down caused by the failure of the transmission power control in the mobile station 1 as the most serious defect included in CDMA method, when the diversity receiver of the embodiment 14 is applied to a receiver in a base station.

Embodiment 15

Figure 30:
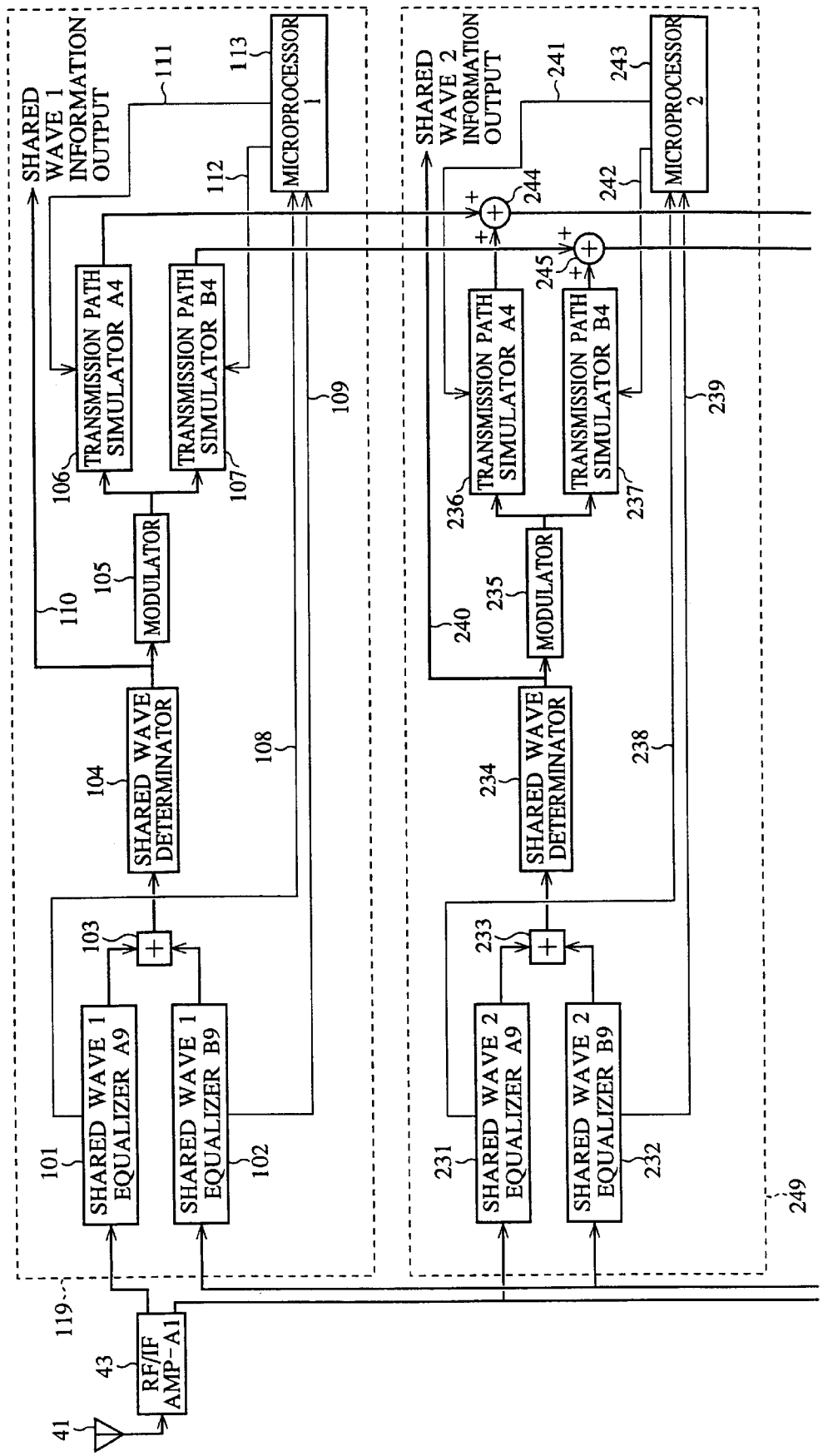
FIGS. 30 and 31 are block diagrams showing a diversity receiver according to the fifteenth embodiment of the present invention.
Figure 31:
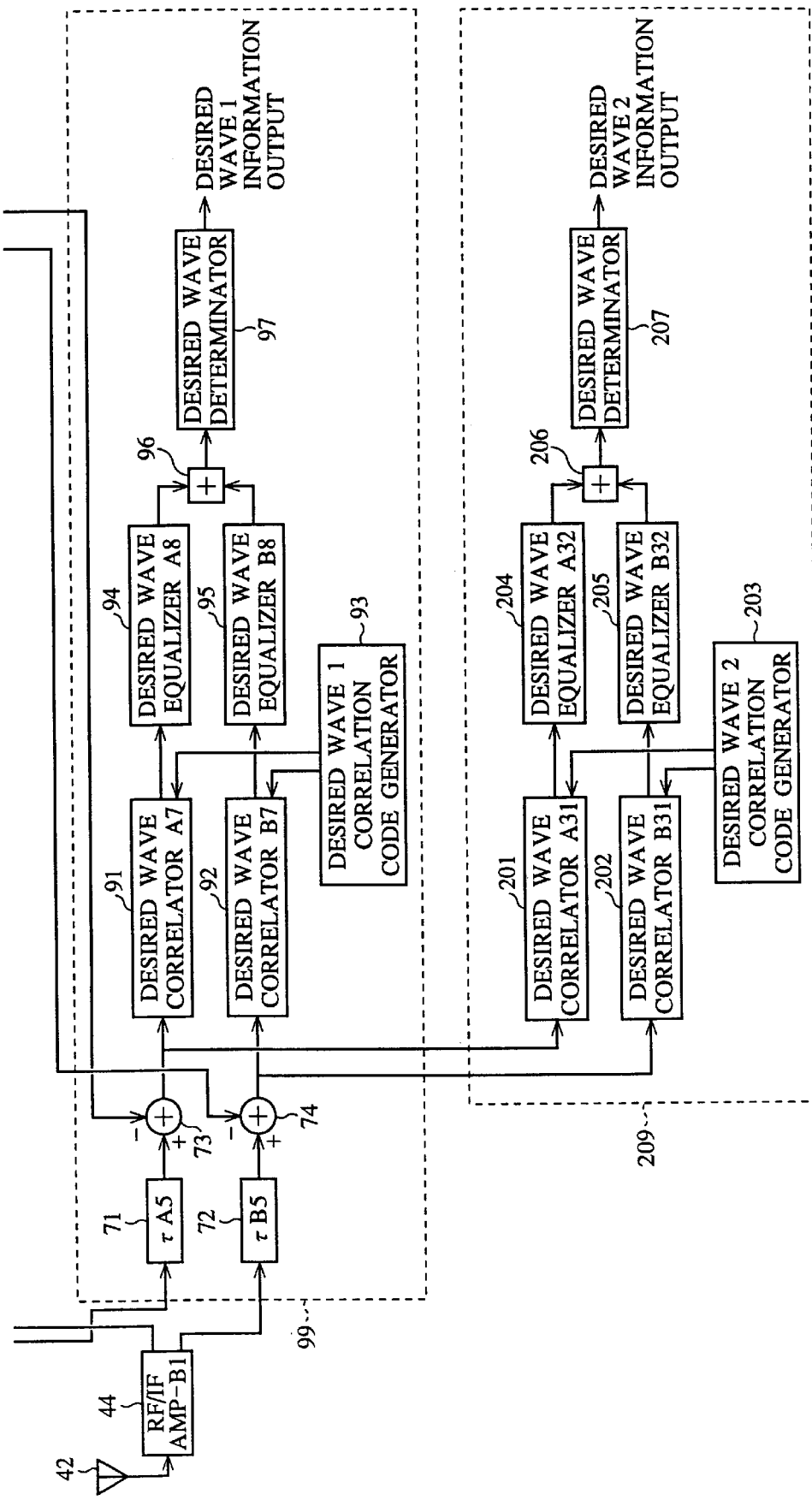

FIGS. 30 and 31 are block diagrams showing a diversity receiver according to the fifteenth embodiment of the present invention. In the diagrams, 119 and 249 designate the shared wave cancellers for removing the FDMA/TDMA signal as the shared wave, and 99 and 209 denote the desired wave receivers for receiving the CDMA signal or the TD-CDMA signal as the desired wave. Specifically, each of the shared wave cancellers 119 and 249 is same as that used in the embodiment 3, and each of the desired wave receivers 99 and 209 is same as the desired wave receiver used in the embodiment 2, therefore the explanation of them is omitted here. Furthermore, the configuration and the operation of each of the shared wave cancellers 119 and 249 and the desired wave receivers 99 and 209 forming the diversity receiver of the embodiment 15 are same as those of the embodiment 2, the embodiment 3, and embodiment 12, therefore, the explanation for them is omitted here.

The diversity receiver of the embodiment 15 can remove each of the shared wave signals simultaneously and efficiently by using a plurality of shared wave cancellers when there are a plurality of shared wave channels.

Embodiment 16

Figure 32:
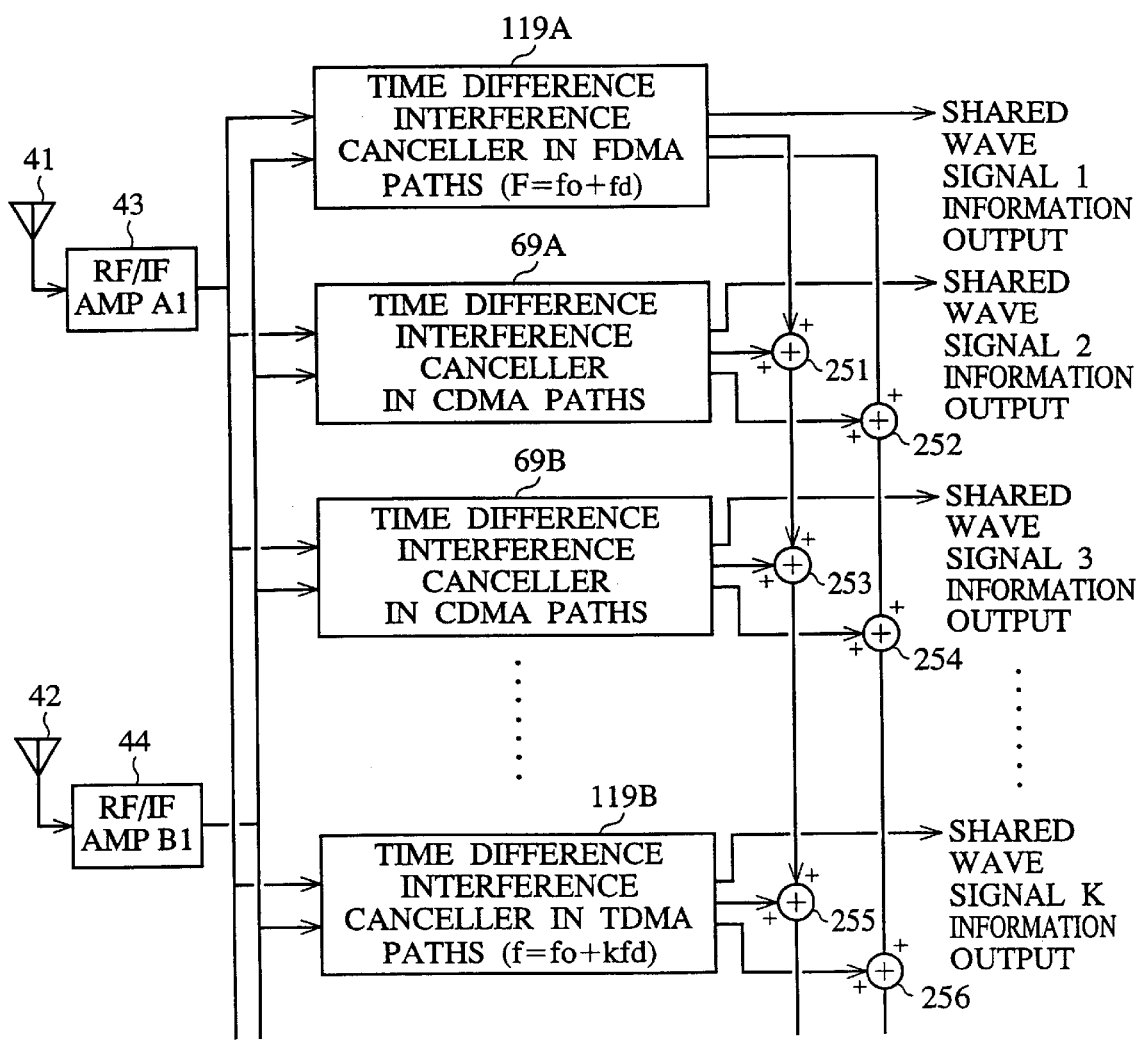
FIGS. 32 and 33 are block diagrams showing a diversity receiver according to the sixteenth embodiment of the present invention.
Figure 33:
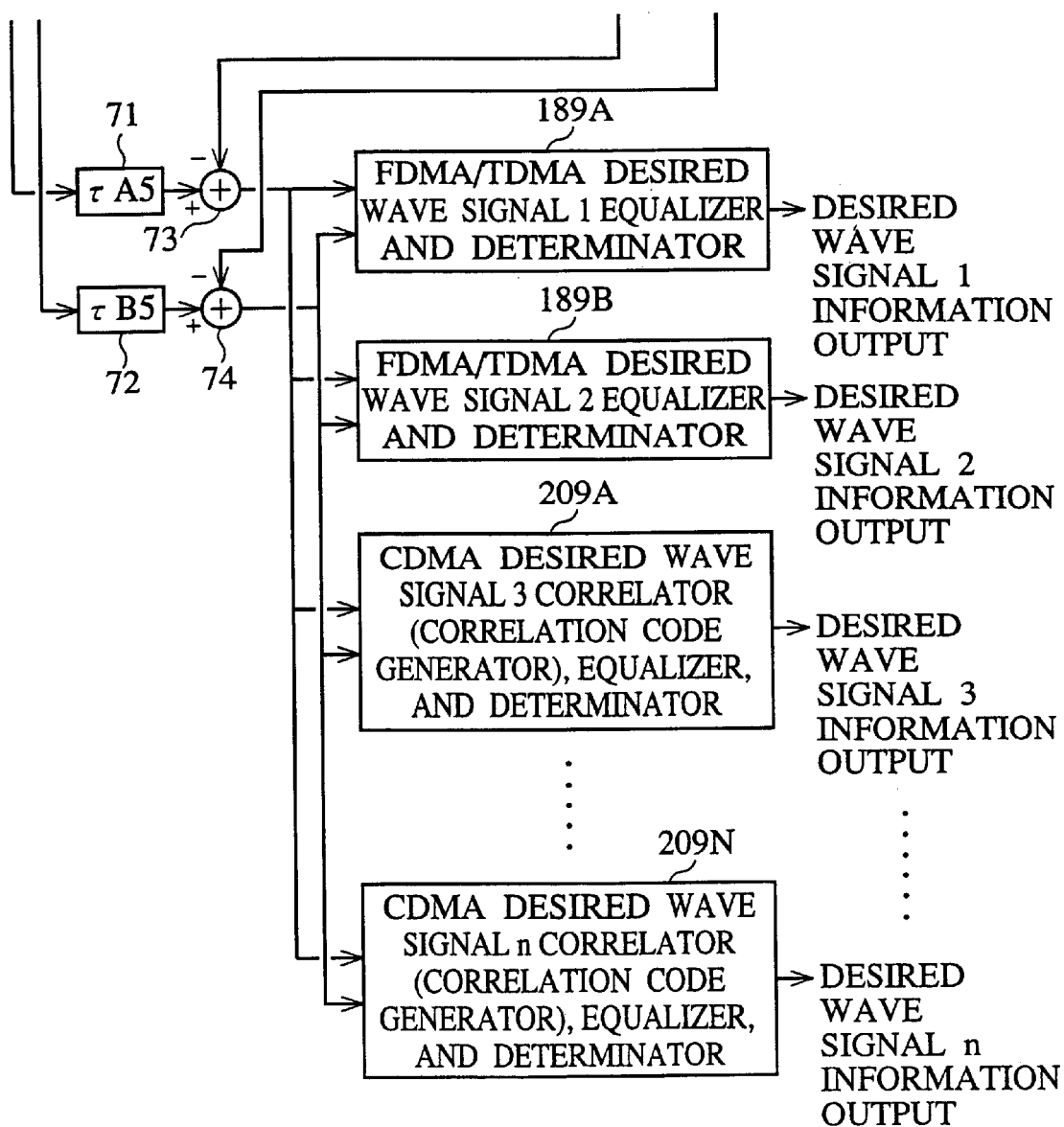

FIGS. 32 and 33 are block diagrams showing a diversity receiver according to the sixteenth embodiment of the present invention. In the diagrams, 119A, 69A, 69B, and 119B designate the shared wave cancellers for removing the FDMA/TDMA signal, the CDMA signal, the TD-CDMA signal as the shared waves. 189A, 189B, 209A, 209B denote the desired wave receivers for selecting and outputting the FDMA/TDMA signal, the CDMA signal, the TD-CDMA signal as the desired waves. These shared wave cancellers and the desired wave receivers are same in configuration and operation as those used in the diversity receivers of the embodiments 1 to 3. The diversity receiver of the embodiment 16 comprises a plurality of shared wave cancellers and desired wave receivers described above. Therefore the explanation for them is omitted here.

The diversity receiver of the embodiment 16 comprises the plurality of shared wave cancellers used when a plurality of shared wave channels are the FDMA/TDMA signal, the CDMA signal, or the TD-CDMA signal. In addition to this configuration, it further comprises a plurality of desired wave receivers used when a plurality of desired wave channels are the FDMA/TDMA signal, the CDMA signal, or the TD-CDMA signal.

The output signal from each of the shared wave cancellers 119A, 69A, 69B, and 119B is added by each of the adders 251 to 256, subtracts from the entire diversity input signal received by the diversity antennas 41 and 42 by the adders 73 and 74, and then outputs to each of the desired wave receivers 189A, 189B, 209A, and 2091B.

As described above, according to the embodiment 16, it is possible to remove a plurality of shared waves simultaneously and to receive a plurality of desired waves with high accuracy by a combination of a plurality of shared wave cancellers and a plurality of shared wave receivers. Furthermore, it can be achieved to avoid the occurrence of the system down in the base station and to use the removed shared wave information effectively. Therefore it is possible to provide the radio communication system of a high efficiency.

INDUSTRIAL APPLICABILITY

As set forth above, the frequency sharing mobile communication system comprising the diversity receiver having the shared wave canceller according to the present invention is suitable to remove shared wave signals from radio frequency signals and to transform desired wave signals, and to use shared wave signals when radio signals are received through diversity antennas in the base stations.

What is claimed is:

1. A frequency sharing mobile communication system which shares frequency spectrum with other mobile communication systems using different multiple access encoding and modulation methods, comprising:

at least one base station having a diversity receiver including multiple antennas for receiving communication signals from different transmission signal paths;

a shared wave cancellation circuit including a plurality of correlators for obtaining shared wave signals from each diversity antenna, a plurality of multi-path equalizers for equalizing respective shared wave signals from said plurality of correlators, a combiner for combining the shared wave signals from said equalizers to obtain shared wave information, and a plurality of multi-path simulators, each for receiving said shared wave information and simulating the transmission path of the signal received by a respective diversity antenna to produce a simulated transmission path shared wave signal;

said simulated transmission path shared wave signals being sent to a desired wave receiver which receives signals from each diversity antenna and subtracts said simulated transmission path shared wave signals from the signals received by each diversity antenna to obtain a desired wave signal.

2. The frequency sharing mobile communication system of claim 1, wherein said shared wave cancellation circuit comprises a CDMA shared wave canceller for cancelling CDMA shared wave signals on CDMA signal channels that share frequencies with FDMA/TDMA signals on a frequency axis.

3. A frequency sharing mobile communication system as claimed in claim 2, wherein the CDMA canceller for cancelling the CDMA signals sharing with the FDMA/TDMA signals in frequency fields, comprises:

CDMA correlators whose number is equal to the number of a plurality of diversity antennas;

a correlation code generator for generating CDMA correlation codes and providing them to the CDMA correlators;

transmission path equalizers whose number is equal to the number of the plurality of diversity antennas;

an adder for adding outputs from the transmission path equalizers;

a determinator for judging the output from the adder;

a modulator for inputting the output from the determinator and for generating and outputting reproduced CDMA signals;

transmission path simulators, whose number is equal to the number of the plurality of diversity antennas, for reproducing interferences in a plurality of transmission paths based on the output from the modulator; and a microprocessor for determining coefficients of the transmission path simulators based on equalization coefficients of the transmission path equalizers.

4. A frequency sharing mobile communication system as claimed in claim 2, wherein the desired wave receiver is a FDMA/TDMA desired wave receiver, which comprises:

delay elements for delaying each of signals received by the plurality of diversity antennas, independently;

adders, whose number is equal to the number of the plurality of diversity antennas, for removing reproduced CDMA signals, whose number is equal to the number of the plurality of diversity antennas, output from the CDMA shared wave cancellers from the output of the delay elements by subtraction;

desired wave equalizers, whose number is equal to the number of plurality of diversity antennas, for equalizing the output from the adders;

a second adder for adding the outputs from the desired wave equalizers; and a desired wave demodulator for outputting a desired wave based on the output from the second adder.

5. A frequency sharing mobile communication system as claimed in claim 4, comprises a plurality of the FDMA/TDMA desired wave receivers and a plurality of CDMA shared wave cancellers, thereby a plurality of the CDMA signals are removed simultaneously.

6. A frequency sharing mobile communication system as claimed in claim 4, comprises at least one base station comprising a plurality of the CDMA shared wave cancellers and a plurality of the FDMA/TDMA desired wave receivers.

7. A frequency sharing mobile communication system as claimed in claim 2, wherein the desired wave receiver is a CDMA desired wave receiver, which comprises:

delay elements for delaying each of signals received by the plurality of diversity antennas, independently;

adders for removing reproduced CDMA signals output from the CDMA shared wave cancellers from the output of the delay elements by subtraction;

CDMA desired wave correlators, whose number is equal to the number of the plurality of diversity antennas, for correlating the output from the adders;

a correlation mode generator for generating CDMA correlation codes and for providing them to the CDMA desired wave correlators;

desired wave equalizers, whose number is equal to the number of the plurality of diversity antennas, for equalizing the output from the CDMA desired wave correlators;

an adder for adding the outputs from the desired wave equalizers; and a desired wave demodulator for outputting a desired wave based on the output from the adder.

8. A frequency sharing mobile communication system as claimed in claim 7, comprises the CDMA desired wave receiver and a plurality of the CDMA shared wave cancellers, thereby a plurality of the CDMA signals are removed simultaneously.

9. A frequency sharing mobile communication system as claimed in claim 7, comprises at least one base station comprising a plurality of the CDMA shared wave cancellers and a plurality of the CDMA desired wave receivers.

10. The frequency sharing mobile communication system of claim 1, wherein said shared wave cancellation circuit comprises a TD-CDMA shared wave canceller for cancelling TD-CDMA shared wave signals that share frequencies with FDMA/TDMA signals on a frequency axis.

11. A frequency sharing mobile communication system as claimed in claim 10, wherein the TD-CDMA canceller for cancelling the TD-CDMA signals sharing with the FDMA/TDMA signals in frequency fields, which comprises:

TD-CDMA correlators whose number is equal to the number of a plurality of diversity antennas;

a correlation code generator for generating TD-CDMA correlation codes and providing them to the TD-CDMA correlators;

transmission path equalizers whose number is equal to the number of the plurality of diversity antennas;

an adder for adding outputs from the transmission path equalizers;

a determinator for judging the output from the adder;

a modulator for generating and outputting reproduced TD-CDMA signals based on the output from the determinater;

transmission path simulators, whose number is equal to the number of the plurality of diversity antennas, for reproducing interferences in a plurality of transmission paths based on the output from the modulator; and a microprocessor for determining coefficients of the transmission path simulators based on equalization coefficients of the transmission path equalizers.

12. A frequency sharing mobile communication system as claimed in claim 10, wherein the desired wave receiver is a FDMA/TDMA desired wave receiver, which comprises:

delay elements for delaying each of signals received by the plurality of diversity antennas, independently:

adders, whose number is equal to the number of the plurality of diversity antennas, for removing reproduced TD-CDMA signals output from the TD-CDMA shared wave cancellers from the output of the delay elements by subtraction;

desired wave equalizers, whose number is equal to the number of the plurality of diversity antennas, for equalizing the output from the adders;

a second adder for adding the outputs from the desired wave equalizers; and a desired wave demodulator for outputting a desired wave based on the output from the second adder.

13. A frequency sharing mobile communication system as claimed in claim 10, wherein the desired wave receiver is a TD-CDMA desired wave receiver, which comprises:

delay elements for delaying each of signals received by the plurality of diversity antennas, independently;

adders for removing reproduced TD-CDMA signals output from the TD-CDMA shared wave cancellers from the output from the delay elements by subtraction;

TD-CDMA desired wave correlators, whose number is equal to the number of the plurality of diversity antennas, for correlating the output from the adders;

a correlation code generator for generating TD-CDMA correlation codes and for providing them to the TD-CDMA desired wave correlators;

desired wave equalizers, whose number is equal to the number of the plurality of diversity antennas, for equalizing the output from the TD-CDMA desired wave correlators;

an adder for adding the outputs from the desired wave equalizers; and a desired wave demodulator for outputting a desired wave based on the output from the adder.

14. A frequency sharing mobile communication system as claimed in claim 10, wherein the desired wave receiver is a CDMA desired wave receiver, which comprises:

delay elements for delaying each of signals received by the plurality of diversity antennas, independently;

adders for removing reproduced TD-CDMA signals output from the TD-CDMA shared wave cancellers from the output of the delay elements by subtraction;

CDMA desired wave correlators, whose number is equal to the number of the plurality of diversity antennas, for correlating the output from the adders;

a correlation code generator for generating CDMA correlation codes and for providing them to the CDMA desired wave correlators;

desired wave equalizers, whose number is equal to the number of the plurality of diversity antennas, for equalizing the output from the CDMA desired wave correlators;

an adder for adding the outputs from the desired wave equalizers; and a desired wave demodulator for outputting a desired wave based on the output from the adder.

15. A frequency sharing mobile communication system as claimed in claim 10, wherein the desired wave receiver is a TD-CDMA desired wave receiver, which comprises:

delay elements for delaying each of signals received by the plurality of diversity antennas, independently;

adders for removing reproduced CDMA signals output from the CDMA shared wave cancellers from the output from the delay elements by subtraction in order to cancel the CDMA signals that share in the frequency field on the frequency axis with the FDMA/1-DMA signals;

TD-CDMA desired wave correlators, whose number is equal to the number of the plurality of diversity antennas, for correlating the output from the adders;

a correlation code generator for generating TD-CDMA correlation codes and for providing them to the TD-CDMA desired wave correlators;

desired wave equalizers, whose number is equal to the number of the plurality of diversity antennas, for equalizing the output from the TD-CDMA desired wave correlators;

an adder for adding the outputs from the desired wave equalizers; and a desired wave demodulator for outputting a desired wave based on the output from the adder.

16. A frequency sharing mobile communication system which shares frequency spectrum with other mobile communication systems using different multiple access encoding and modulation methods, comprising:

at least one base station having a diversity receiver including multiple antennas for receiving communication signals from different transmission signal paths;

a shared wave cancellation circuit comprising a FDMA/TDMA shared wave canceller for cancelling shared wave signals on FDMA/TDMA signal channels that share frequencies with CDMA signals on a frequency axis or with TD-CDMA signals in a time slot, said cancellation circuit including a plurality of multi-path equalizers for equalizing respective shared wave signals received from respective ones of said multiple antennas, a combiner for combining the shared wave signals from said equalizers to obtain shared wave information, and a plurality of multi-path simulators, each for receiving said shared wave information and simulating the transmission path of the signal received by a respective diversity antenna to produce a simulated transmission path shared wave signal;

said simulated transmission path shared wave signals being sent to a desired wave receiver which receives signals from each diversity antenna and subtracts said simulated transmission path shared wave signals from the signals received by each diversity antenna to obtain a desired wave signal.

17. A frequency sharing mobile communication system as claimed in claim 16, wherein the FDMA/TDMA shared wave canceller comprises:

transmission path equalizers whose number is equal to the number of the plurality of diversity antennas;

an adder for adding outputs from the transmission path equalizers;

a determinator for judging the output from the adder;

a modulator for inputting the output from the determinator and for generating and outputting reproduced FDMA/TDMA signals;

transmission path simulators, whose number is equal to the number of the plurality of diversity antennas, for reproducing interferences in the transmission path based on the output from the modulator; and a microprocessor for determining coefficients of the transmission path simulators based on equalization coefficients of the transmission path equalizers.

18. A frequency sharing mobile communication system as claimed in claim 16, wherein the desired wave receiver is a CDMA desired wave receiver, which comprises:

delay elements, whose number is equal to the number of a plurality of diversity antennas, for delaying each of signals received by the plurality of diversity antennas, independently;

adders, whose number is equal to the number of the plurality of diversity antennas, for removing reproduced FDMA/TDMA signals output from the FDMA/TDMA shared wave cancellers from the output of the delay elements by subtraction;

CDMA desired wave correlators, whose number is equal to the number of the plurality of diversity antennas, for correlating the output from the adders;

a correlation code generator for generating CDMA correlation codes and for providing them to the CDMA desired wave correlators;

desired wave equalizers, whose number is equal to the number of the plurality of diversity antennas, for equalizing the output from the CDMA desired wave correlators;

an adder for adding the outputs from the desired wave equalizers; and a desired wave demodulator for outputting a desired wave based on the output from the adder.

19. A frequency sharing mobile communication system as claimed in claim 16, wherein the desired wave receiver is a TD-CDMA desired wave receiver, which comprises:

delay elements for delaying each of signals received by the plurality of diversity antennas, independently;

adders, whose number is equal to the number of the plurality of diversity antennas, for removing reproduced FDMA/TDMA signals output from the FDMA/TDMA shared wave cancellers from TD-CDMA signals designated by a time slot that being equal to the time slot of the shared waves output from the delay elements;

TD-CDMA desired wave correlators, whose number is equal to the number of the plurality of diversity antennas, for correlating the output having no shared wave signals provided from the adders;

a correlation code generator for generating TD-CDMA correlation codes and for providing them to the TD-CDMA desired wave correlators;

desired wave equalizers, whose number is equal to the number of the plurality of diversity antennas, for equalizing the output from the TD-CDMA desired wave correlators;

an adder for adding the outputs from the desired wave equalizers; and a desired wave demodulator for outputting a desired wave based on the output from the adder.

20. A frequency sharing mobile communication system as claimed in claim 16, which comprises a plurality of the FDMA/TDMA shared wave cancellers and a plurality of the CDMA or TD-CDMA desired wave receivers, thereby, a plurality of the FDMA/TDMA shared wave signals are removed simultaneously.

21. A frequency sharing mobile communication system having at least one base station comprising:

a plurality of CDMA shared wave cancellers for canceling shared waves on channels of CDMA signals that share frequencies with FDMA/TDMA signals on a frequency axis;

a plurality of TD-CDMA shared wave cancellers for canceling TD-CDMA signals that share frequencies with said FDMA/TDMA signals;

a plurality of FDMA/TDMA shared wave cancellers for canceling shared waves on FDMA/TDMA signal channels that share frequencies with CDMA signals on a frequency axis or share frequencies with TD-CDMA signals in a same time slot;

a plurality of desired FDMA/TDMA wave receivers comprising:
  delay elements for delaying each of signals received by a plurality of diversity antennas, independently;
  a plurality of adders, whose number is equal to the number of the plurality of diversity antennas, for removing reproduced CDMA signals, whose number is equal to the number of the plurality of diversity antennas, outputted by the CDMA shared wave cancellers from the output of the delay elements by subtraction;
  a plurality of desired wave equalizers, whose number is equal to the number of the plurality of diversity antennas, for equalizing the output from the adders;
  a second adder for adding the outputs from the desired wave equalizers; and
  a desired wave demodulator for outputting a desired wave based on the output from the second adder;

a plurality of CDMA desired wave receivers, which comprises:
  a plurality of delay elements for delaying each of signals received by the plurality of diversity antennas, independently;
  a plurality of adders for removing reproduced CDMA signals outputted from the CDMA shared wave cancellers from the output of the delay elements by subtraction;
  a plurality of CDMA desired wave correlators, whose number is equal to the number of the plurality of diversity antennas, for correlating the output from the adders;
  a correlation code generator for generating CDMA correlation codes and for providing them to the CDMA desired wave correlators;
  a plurality of desired wave equalizers, whose number is equal to the number of the plurality of diversity antennas, for equalizing the output from the CDMA desired wave correlators;
  an adder for adding the outputs from the desired wave equalizers; and
  a desired wave demodulator for outputting a desired wave based on the output from the adder; and a plurality of TD-CDMA desired wave receivers, which comprises:
  a plurality of delay elements for delaying each of signals received by the plurality of diversity antennas, independently;
  a plurality of adders for removing reproduced TD-CDMA signals output from the TD-CDMA shared wave cancellers from the output from the delay elements by subtraction;
  a plurality of TD-CDMA desired wave correlators, whose number is equal to the number of the plurality of diversity antennas, for correlating the output from the adders;
  a correlation code generator for generating TD-CDMA correlation codes and for providing them to the TD-CDMA desired wave correlators;
  a plurality of desired wave equalizers, whose number is equal to the number of the plurality of diversity antennas, for equalizing the output from the TD-CDMA desired wave correlators; an adder for adding the outputs from the desired wave equalizers; and
  a desired wave demodulator for outputting a desired wave based on the output from the adder.

* * * * *